US012620533B1

(12) United States Patent
Suzuki et al.

(10) Patent No.: US 12,620,533 B1
(45) Date of Patent: May 5, 2026

(54) ELECTRONIC COMPONENT AND METHOD OF MANUFACTURING ELECTRONIC COMPONENT

(71) Applicant: KYOCERA CORPORATION, Kyoto (JP)

(72) Inventors: Tatsuya Suzuki, Kirishima (JP); Hirotoshi Kii, Kirishima (JP); Satoru Naokawa, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 19/226,365

(22) Filed: Jun. 3, 2025

Related U.S. Application Data

(63) Continuation-in-part of application No. PCT/JP2024/045748, filed on Dec. 24, 2024.

(51) Int. Cl.
*H01G 4/30* (2006.01)
*H01G 4/012* (2006.01)
*H01G 4/232* (2006.01)

(52) U.S. Cl.
CPC .............. *H01G 4/30* (2013.01); *H01G 4/012* (2013.01); *H01G 4/232* (2013.01)

(58) Field of Classification Search
CPC ........... H01G 4/012; H01G 4/232; H01G 4/30
See application file for complete search history.

(56) References Cited

U.S. PATENT DOCUMENTS

| | | | |
|---|---|---|---|
| 2006/0039097 A1 * | 2/2006 | Satou ...................... | H01G 4/30 361/303 |
| 2012/0218678 A1 | 8/2012 | Satou | |

| | | | |
|---|---|---|---|
| 2012/0300361 A1 | 11/2012 | Togashi | |
| 2013/0056252 A1 | 3/2013 | Fujii et al. | |
| 2014/0185184 A1 | 7/2014 | Ahn et al. | |
| 2014/0290998 A1 * | 10/2014 | Ahn ........................ | H01G 4/248 361/301.4 |
| 2015/0062775 A1 | 3/2015 | Shibasaki et al. | |
| 2018/0182551 A1 * | 6/2018 | Ahn ......................... | H01G 4/12 |
| 2020/0027658 A1 * | 1/2020 | Lee ......................... | H01G 4/12 |
| 2020/0243259 A1 * | 7/2020 | Berolini ................... | H01G 4/12 |
| 2022/0189689 A1 * | 6/2022 | Pyo ......................... | H01G 4/005 |

FOREIGN PATENT DOCUMENTS

| | | |
|---|---|---|
| JP | 2012-248581 A | 12/2012 |
| JP | 2013-102232 A | 5/2013 |
| JP | 2014-132633 A | 7/2014 |
| JP | 2015-065414 A | 4/2015 |
| WO | 2012/043740 A1 | 4/2012 |
| WO | WO-2024210103 A1 * | 10/2024 ............... H01G 4/30 |

* cited by examiner

*Primary Examiner* — Nathan Milakovich
(74) *Attorney, Agent, or Firm* — Volpe Koenig

(57) ABSTRACT

An electronic component includes a functional part, a first cover, and a second cover. The first cover overlaps the functional part from a first side in a first direction. The second cover overlaps the functional part from a second side, the second side being on an opposite side from the first side. The first cover includes one or more first ceramic layers and one or more first conductor layers stacked in an alternating manner with the one or more first ceramic layers. The second cover includes one or more second ceramic layers and one or more second conductor layers stacked in an alternating manner with the one or more second ceramic layers. The configuration of the first cover and the configuration of the second cover are asymmetrical with each other with respect to the functional part.

19 Claims, 9 Drawing Sheets

ELECTRONIC COMPONENT AND METHOD OF MANUFACTURING ELECTRONIC COMPONENT

CROSS-REFERENCE TO RELATED APPLICATION

The present application is a Continuation-in-Part of International Application No. PCT/JP2024/045748, filed on Dec. 24, 2024, the entirety of which is incorporated by reference as if fully set forth herein.

BACKGROUND OF THE INVENTION

1. Field of the Invention

The present disclosure relates to an electronic component such as a multilayer ceramic capacitor and to a method of manufacturing such an electronic component.

2. Description of the Related Art

A known multilayer ceramic capacitor includes ceramic layers and internal electrodes stacked in an alternating manner (see, for example, below mentioned International Publication No. 2012/043740). International Publication No. 2012/043740 discloses a configuration in which a base layer is provided on the top surface of a functional part consisting of the ceramic layers and the internal electrodes. International Publication No. 2012/043740 discloses an issue of warping occurring in capacitors due to the sintering shrinkage rates of ceramic components and metal components. In International Publication No. 2012/043740, the base layer is composed of a ceramic containing metal particles in order to solve this issue.

SUMMARY OF THE INVENTION

In an aspect of the present disclosure, an electronic component includes a functional part, a first cover, and a second cover. The first cover overlaps the functional part from a first side in a first direction. The second cover overlaps the functional part from a second side, the second side being on an opposite side from the first side. The first cover includes one or more first ceramic layers and one or more first conductor layers stacked in an alternating manner with the one or more first ceramic layers. The second cover includes one or more second ceramic layers and one or more second conductor layers stacked in an alternating manner with the one or more second ceramic layers. A configuration of the first cover and a configuration of the second cover are asymmetrical with each other with respect to the functional part.

In an aspect of the present disclosure, a method of manufacturing an electronic component includes stacking ceramic green sheets to obtain an unfired multilayer body, and firing the unfired multilayer body. The unfired multilayer body includes an unfired functional part, an unfired first cover, and an unfired second cover. The unfired first cover overlaps the unfired functional part from a first side. The unfired second cover overlaps the unfired functional part from a second side, the second side being on an opposite side from the first side. The unfired first cover includes one or more first ceramic green sheets and one or more first conductive paste layers stacked in an alternating manner with the one or more first ceramic green sheets. The unfired second cover includes one or more second ceramic green sheets and one or more second conductive paste layers stacked in an alternating manner with the one or more second ceramic green sheets. A configuration of the unfired first cover and a configuration of the unfired second cover are asymmetrical with each other with respect to the unfired functional part.

BRIEF DESCRIPTION OF THE DRAWINGS

FIG. 2 is a schematic exploded perspective view of the capacitor in FIG. 1;

FIG. 3 is a cross-sectional view taken along line III-III in FIG. 1;

DESCRIPTION OF THE PREFERRED EMBODIMENTS

Figure 1:
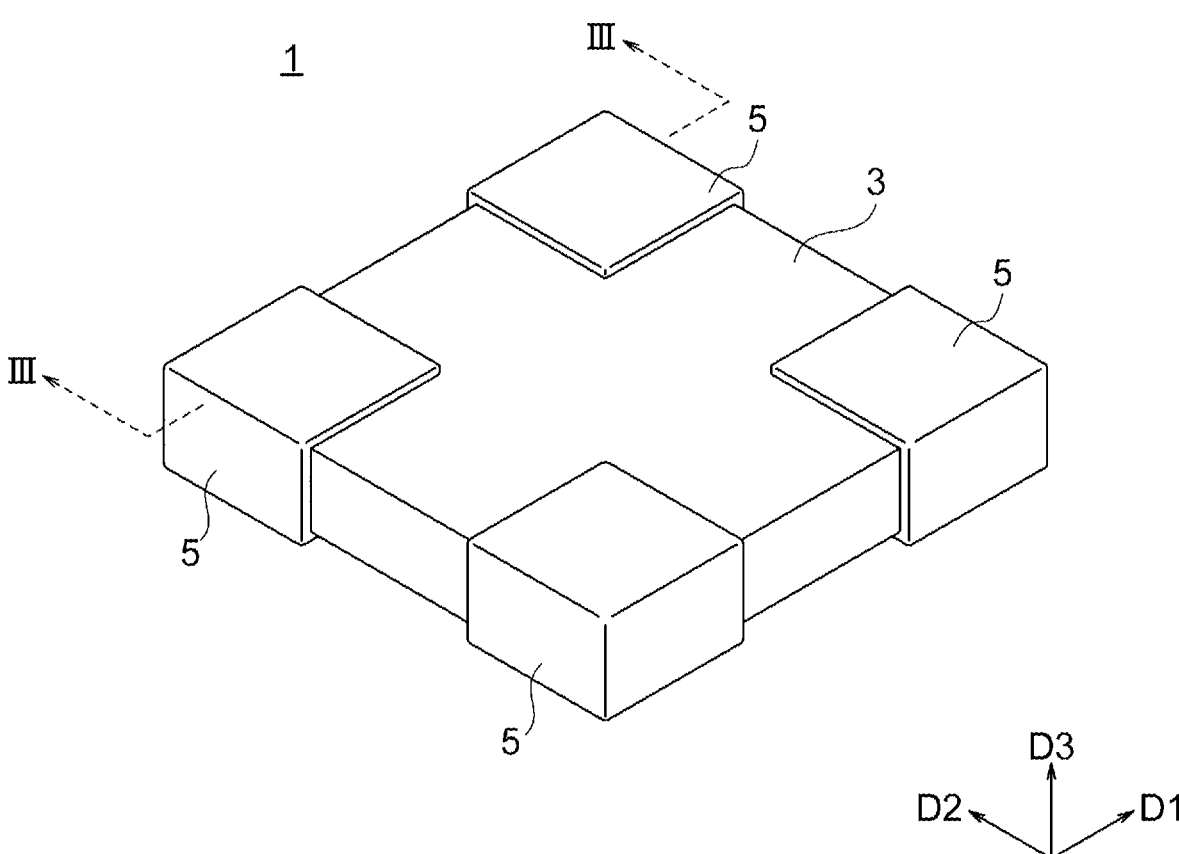
FIG. 1 is a perspective view illustrating a capacitor according to an embodiment.

Hereinafter, embodiments according to the present disclosure will be described while referring to the drawings. The drawings used in the following description are schematic drawings. Therefore, the dimensional ratios and so forth in the drawings do not necessarily match the actual dimensional ratios and so forth. There may be cases where the dimensional ratios and so forth do not match from drawing to drawing. Certain shapes or dimensions etc. may be depicted in an exaggerated fashion, and details may be omitted. However, this does not deny the possibility that the actual shapes and/or dimensions may be as depicted in the drawings, or that features of the shapes and/or dimensions may be extracted from the drawings.

In the description of an embodiment described relatively later, basically, only the differences from relatively previously described embodiments will be described. Matters not specifically mentioned may be assumed to be the same as or similar to those in previously described embodiments or may be inferred from the previously described embodiments. For the sake of convenience, the same symbols may be used for components that correspond to each other in different embodiments, even if there are differences.

In the description of embodiments, the term "shape" may or may not include dimensions. So long as no contradictions arise, this term may be interpreted either way. When rectangles (or rectangular shapes) or rectangular parallelepipeds (rectangular parallelepiped shapes) are referred to, the corners of these shapes may be rounded. In addition, relatively small recesses or protrusions (not errors, but intentional) may also be formed. This also applies to other shapes. When a certain layer is said to have a constant thickness, variations in thickness caused by manufacturing errors may be present (as long as a constant thickness is intended).

A determination may reasonably be made as to whether various dimensions fall within ranges (absolute values such as μm or relative values with respect to other dimensions) given in the description of embodiments. For example, the dimensions of unique parts may be excluded from consideration. More specifically, for example, chamfered parts may be ignored when determining whether a thickness falls within a certain range. In addition, for example, in a layer for which a certain thickness is intended, if the thickness of an end portion of the layer is significantly different (e.g. significantly smaller) than the thickness of the majority of the rest of the layer (e.g. 60% or more or 80% or more of the area of the layer), the thickness of the end portion may be excluded from consideration. In cases where there are variations in thickness in the majority of a certain layer for which a constant thickness is intended as mentioned above, an average value may be referenced, for example. If, for example, both the minimum value and the maximum value of the thickness fall within a numerical range, there is of course no need to make the effort to identify and reference an average value.

With respect to the material (conductive material or insulating material, etc.), the main component may be, for example, a component that accounts for 60 wt % or more, 80 wt % or more, or 100 wt % (excluding errors) of the material. In the description of embodiments, the term main component may be replaced by the term 60 wt % or more component, 80 wt % or more component, or 100 wt % component, so long as no contradictions or the like arise.

As the process of manufacturing an electronic components progresses, the composition and microstructure of the materials in each part of the electronic component may change. For convenience, the same symbols may be referenced or the same terms may be used before and after such changes.

Overview of Embodiments

FIG. 1 is a perspective view illustrating a capacitor 1 (an example of an electronic component) according to an embodiment. A Cartesian coordinate system D1D2D3 is added to FIG. 1 and other drawings referred to below for convenience. The capacitor 1 may be used with either side being regarded as a top side or a bottom side. However, in the description of the embodiments, the +D3 side may be regarded as up, and terms such as top surface and bottom surface may be used for convenience.

The capacitor 1 is, for example, a multilayer ceramic capacitor. The capacitor 1 includes a substantially rectangular-parallelepiped-shaped body 3 and four external electrodes 5 located at the four corners of the body 3 in plan view (looking in the D3 direction). The external electrodes 5 contribute to electrically connecting the capacitor 1 to another electronic component (for example, a circuit board, which is not illustrated).

Figure 3:
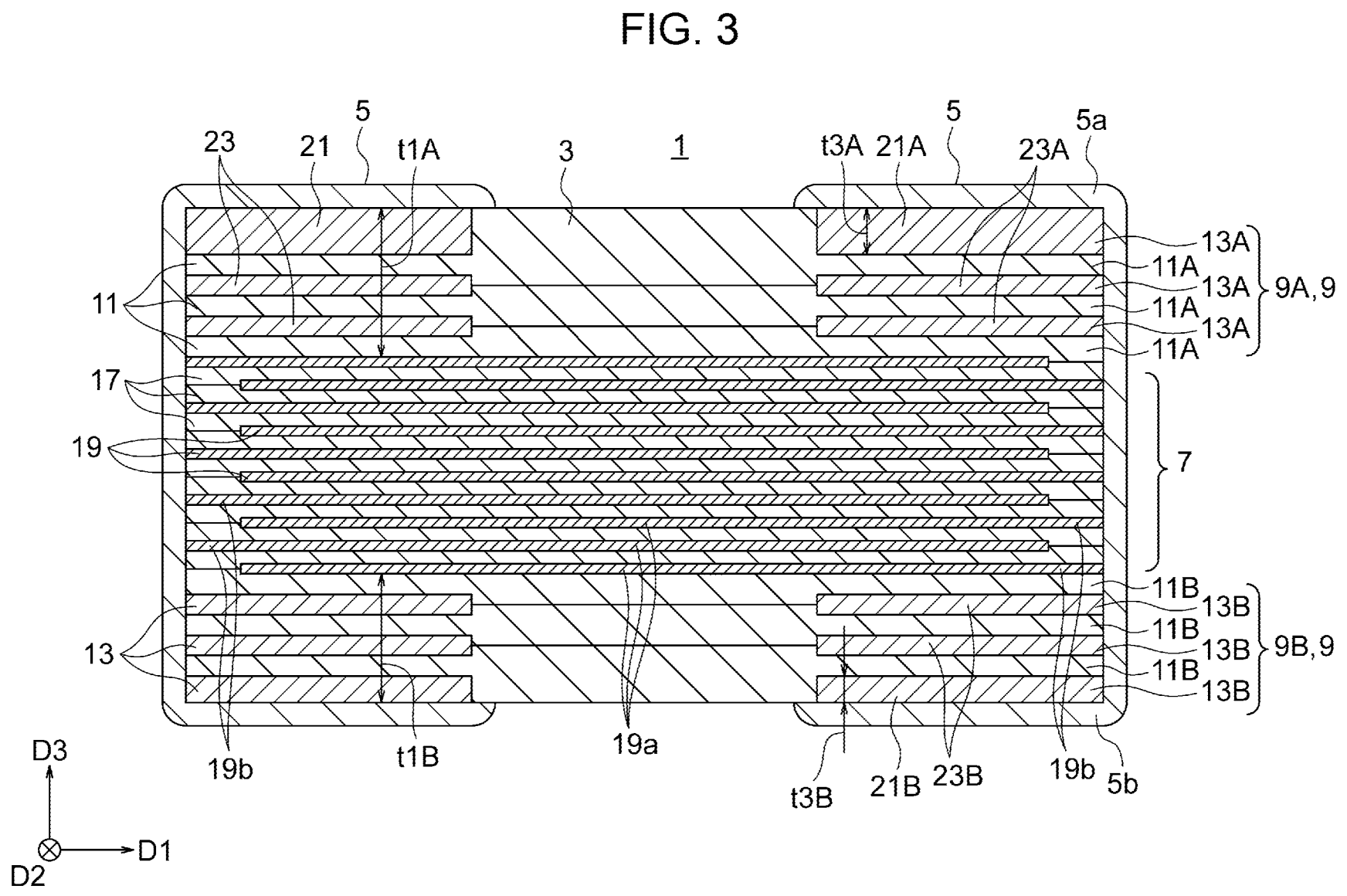

FIG. 3 is a cross-sectional view taken along line III-III in FIG. 1. FIG. 3 illustrates a D1D3 cross section that cuts through the external electrodes 5 on the +D2 side. However, a D1D3 cross section that cuts through the external electrodes 5 on the −D2 side, a D2D3 cross section that cuts through the external electrodes 5 on the −D1 side, and a D2D3 cross section that cuts the external electrodes 5 on the +D1 side would be basically identical to that in FIG. 3. In the description of embodiments, for convenience, the positional relationships between components etc. will be described using terms D1, D2, and D3 assuming the cross section illustrated in FIG. 3 unless otherwise specified.

For convenience, FIG. 3 depicts the boundaries between ceramic layers 11 and dielectric layers 17, which are described below. However, these boundaries may be imperceptible. The ceramic layers 11 and the dielectric layers 17 may be identified as being different layers from each other based on the fact that the layers are separated by conductor layers 13 and internal electrodes 19, etc., as described below.

The body 3 includes, for example, a functional part 7 and two covers 9 (9A and 9B) respectively overlapping a top surface and a bottom surface of the functional part 7. The functional part 7 is the part (or at least a portion of the part) that directly carries out the function of an electronic component (in this case, a capacitor). The covers 9, for example, contribute to protecting the functional part 7 and/or increasing the strength of the capacitor 1.

Among the two covers 9, the cover 9 on the +D3 side will be referred to as a first cover 9A and the cover 9 on the −D3 side will be referred to as a second cover 9B. In addition, components of the first cover 9A may be indicated using "first" and "A" as in "first ceramic layer 11A". Similarly, components of the second cover 9B may be indicated using "second" and "B" as in "second ceramic layer 11B". Furthermore, when no particular distinction is made as to whether a component belongs to the first cover 9A or the second cover 9B, "first", "second", "A", and "B" may not be added, as in "ceramic layer 11".

Each cover 9 includes one or more ceramic layers 11 (three layers in the illustrated example) and one or more conductor layers 13 (three layers in the illustrated example) stacked in an alternating manner. Although the term "alternating" is used for convenience, only one ceramic layer 11 and one conductor layer 13 may be provided. The ceramic layers 11, for example, contributes to insulation of the functional part 7. The conductor layers 13 contribute to, for example, deposition of the metal that will become the external electrodes 5 using a plating method and/or contributes to improving the adherence of the external electrodes 5 to the body 3.

The configuration of the first cover 9A and the configuration of the second cover 9B are asymmetrical with each other with respect to the functional part 7 (are vertically asymmetrical with respect to each other). For example, in the illustrated example, a thickness t1A of the first cover 9A is greater than a thickness t1B of the second cover 9B. A thickness t3A of a first conductor layer 13A located farthest toward the +D3 side is greater than a thickness t3B of a second conductor layer 13B located farthest toward the −D3 side. This vertically asymmetrical configuration, for example, reduces the warping that occurs when a multilayer body, which will become the body 3, is fired during the process of manufacturing the capacitor 1, as will be described in detail later.

The effects described above do not necessarily need to be achieved. In addition, technical ideas different from the perspectives described above may be extracted from the present disclosure. In this case, for example, configurations different from those described above may be employed. For example, the covers 9 do not need to include the conductor layers 13.

An overview of embodiments has been described above. Hereafter, embodiments will be briefly described in the following order.

1. Configuration of capacitor (FIGS. 1 to 3)
   1.1 Overall configuration
   1.2 Functional part 1.3 Covers
1.3.1. Covers as a whole
1.3.2 Ceramic layers
1.3.3. Conductor layers (dummy electrodes and base electrodes)
1.3.4. Embedded structure of base electrodes
1.3.5 Examples of asymmetry in vertical direction and dimensions
1.4 External electrodes
2. Method of manufacturing capacitor (FIG. 4)
3. Examples of actions due to asymmetry and examples of particle size (FIG. 5)
4. Examples (FIGS. 6 and 7)
5. Other embodiments (FIGS. 8 and 9)
5.1 Another example related to vertical asymmetry
5.2 Another example related to terminals
5.3 Another example of electronic component other than capacitor
6. Summary of embodiments

1. CONFIGURATION OF CAPACITOR 1.1 Overall Configuration

The capacitor 1 illustrated in FIG. 1 is, for example, configured as a surface mounted chip component. For example, the capacitor 1 is disposed so that the surface of the capacitor 1 on the −D3 side or +D3 side faces a circuit board, which is not illustrated. The capacitor 1 is mounted on the circuit board by bonding four pads on the circuit board to the four external electrodes 5 using a conductive bonding material (for example, solder), which is not illustrated.

The configuration of the capacitor 1 (internal structure and external appearance) has, for example, roughly 180° rotational symmetry when viewed in the D3 direction. Of course, the capacitor 1 does not need to have such symmetry.

The body 3 has, for example, roughly, a thin rectangular parallelepiped shape. "Thin" is defined, for example, as having a length in the D3 direction that is smaller than each of the lengths in the D1 and D2 directions (or the maximum length, for example, if the body is not rectangular parallelepiped shaped) in the body 3. The rectangular parallelepiped may be square (illustrated example) or oblong (excluding square; the same applies hereafter) in plan view. Although not specifically illustrated, the body 3 may have relatively large chamfered corners in plan view and/or side view. The specific dimensions of the body 3 (or capacitor 1) may be any dimensions. Later, in the description of the specific dimensions of the covers 9, examples of specific dimensions of the body 3 will also be given.

As mentioned above, the first cover 9A and the second cover 9B are asymmetrical in the vertical direction. However, unless otherwise noted, multiple components of the same type (e.g., 5, 11, 13, 17, and 19, etc.) may be provided with essentially the same (or corresponding) shape, size, material, and location as each other. Therefore, unless otherwise specified, and unless contradictions etc. arise, a description of one component may be taken to commonly apply to other components of the same type.

A single-layer (film-like) component (e.g., 5, 11, 13, 17, and 19, etc.) may be entirely composed of one type of material. However, a single-layer component may consist of layers of different materials stacked on top of each other. A single-layer component, which is entirely composed of one type of material, may be composed of a single layer or may be composed of multiple layers of the same material when focusing on the manufacturing process.

a. Functional Part

The functional part 7 illustrated in FIG. 3 has, for example, a roughly thin rectangular parallelepiped shape. The planar shape thereof may be basically the same as that of the body 3. The functional part 7 may have any thickness. Later, in the description of the specific dimensions of the covers 9, examples of the specific thickness of the functional part 7 will also be given. The functional part 7 has a substantially symmetrical configuration in the vertical direction. Here, "substantially symmetrical" includes a case where the uppermost internal electrode 19 (described later) and the lowermost internal electrode 19 are asymmetrical.

The functional part 7 includes multiple dielectric layers 17 and multiple internal electrodes 19 stacked in an alternating manner. Thus, the function of a capacitor is realized.

Each dielectric layer 17 is basically shaped like a layer having a constant thickness (at least between the internal electrodes 19). The shape and dimensions of the dielectric layers 17 in plan view are basically the same as the shape and dimensions of the functional part 7 in plan view. The thickness of the dielectric layers 17 may be set as appropriate in accordance with the characteristics required for the capacitor 1. As an example of a relatively small thickness, a thickness between internal electrodes 19 that are adjacent to each other in the D3 direction may be 0.1 μm or more or 0.5 μm or more, and 3.0 μm or less, 2.0 μm or less, or 1.0 μm or less. These lower and upper limits may be used in any combination with each other. The number of stacked dielectric layers 17 (internal electrodes 19) may be any number. As an example, there may be 10 or more layers and 30 or less layers. The material of the dielectric layers is, for example, a ceramic, and any specific type of ceramic may be used.

Each internal electrode 19 is shaped like a layer having a constant thickness. The internal electrodes 19 may have any thickness, and may have, for example, a thickness smaller than, approximately the same as, or greater than the thickness of the dielectric layers 17 in the regions between the internal electrodes 19. As an example of a relatively small thickness, the thickness of the internal electrodes 19 may be 0.3 μm or more or 0.5 μm or more, and 3.0 μm or less, 2.0 μm or less, or 1.0 μm or less. These lower and upper limits may be used in any combination with each other. The material (for example, main component) of the internal electrodes 19 is, for example, a metal. The specific type of metal may be any metal, and, for example, is entirely or mainly composed of a base metal. Base metals are, for example, alloys that contain Ni or Cu or at least one of these as a main component. The material of the internal electrodes 19 may contain a ceramic (co-material).

Figure 2:
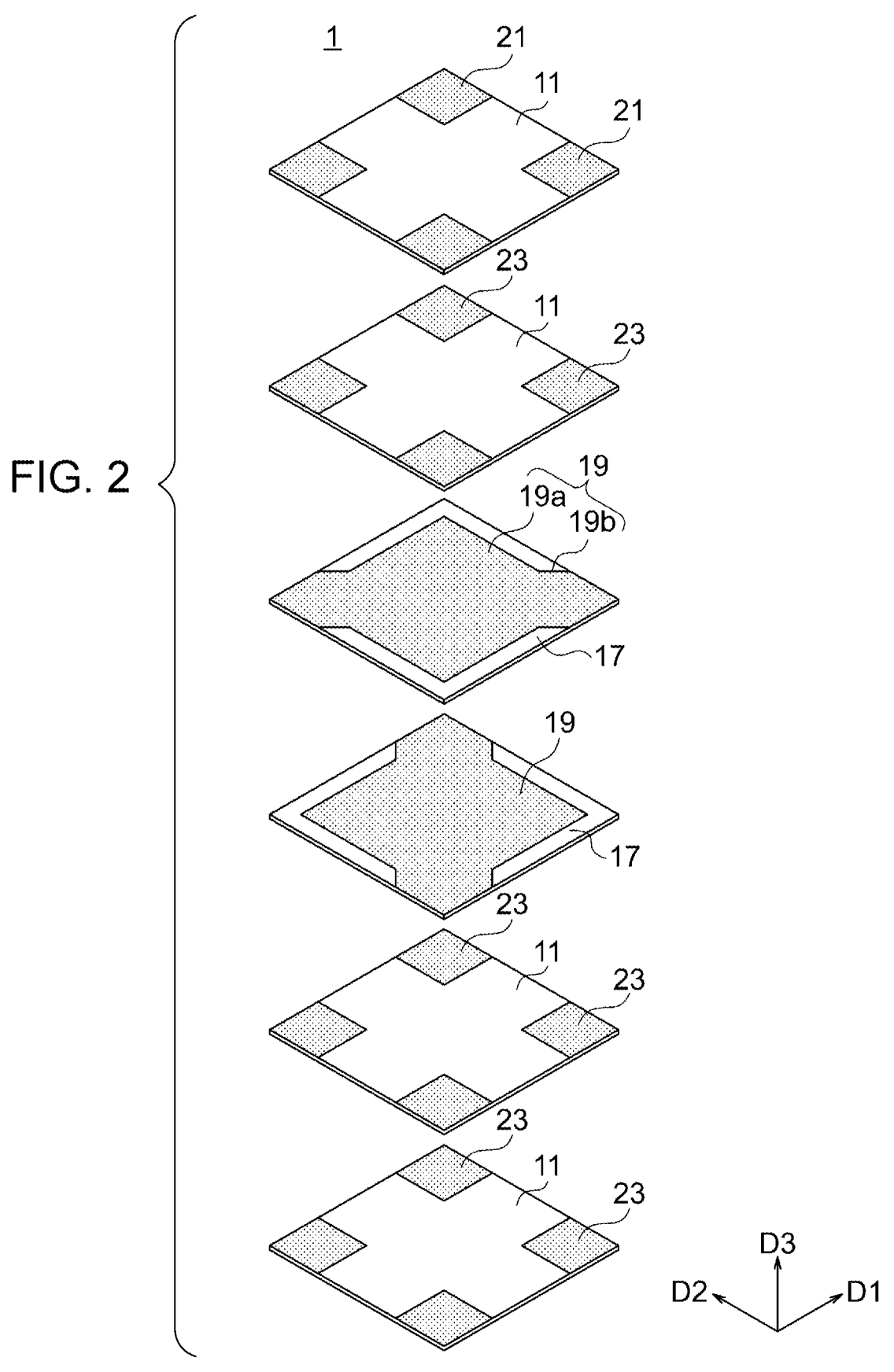

FIG. 2 is an exploded perspective view of the capacitor 1. FIG. 2 is a schematic diagram for describing the planar shapes and relative positions of the internal electrodes 19 etc. Therefore, the various layers are depicted as being smaller in number in FIG. 2 than in FIG. 3.

The internal electrodes 19, for example, each include a rectangular (square in the illustrated example) electrode body 19a in plan view and a pair of lead-out electrodes 19b extending out from a pair of mutually opposing corners of the electrode body 19a. Any dimensions may be used as the specific dimensions of each part.

The electrode body 19a is a region where the internal electrodes 19 adjacent to each other in the D3 direction overlap each other. Each electrode body 19a is positioned inward from the outer edge of the corresponding dielectric layer 17 and is not exposed from the side surfaces of the functional part 7.

The pair of lead-out electrodes 19*b* extend to the outer edge of the dielectric layer 17 and are connected to the pair of external electrodes 5 located at the pair of mutually opposing corners of the body 3. The internal electrodes 19 that are adjacent to each other in the D3 direction are connected to different pairs of external electrodes 5.

1.3 Covers 1.3.1. Covers as a Whole

Each cover 9 illustrated in FIG. 3 is shaped like a layer substantially having a shape and dimensions so as to approximately perfectly overlap the functional part 7. The thickness of the cover 9 is substantially constant.

As previously mentioned, in the illustrated example, the two covers 9 differ from each other in terms of the thickness of the cover 9 and the thickness of the outermost conductor layer 13. In the illustrated example, in addition to the above differences, the thickness of the region of the outermost ceramic layer 11 where the conductor layer 13 is not disposed (around the center in the D1 direction) also differs between the two covers 9. Except for these differences, the configurations of the two covers 9 may be identical to each other.

1.3.2. Ceramic Layers

The ceramic layers 11 are, for example, substantially shaped like layers having a constant thickness, except for changes in thickness caused by overlapping or not overlapping conductor layers (13 and 19). The planar shape of the ceramic layers 11 is, for example, basically the same as the planar shape of the dielectric layers 17.

The number of ceramic layers 11 (the number of conductor layers 13 from another perspective) may be any number. In the illustrated example, three layers are illustrated, but the number of ceramic layers 11 may be 1, 2, or 4 or more.

The ceramic layers 11 may have any thickness. For example, the thickness of each ceramic layer 11 (e.g., the part sandwiched between conductors) may be greater (illustrated example), equal to, or smaller than the thickness of the dielectric layers 17 (between internal electrodes 19). For example, the thicknesses of the multiple ceramic layers 11 may be the same as or different from each other.

The ceramic layers 11 may be composed of any material. For example, the material of the ceramic layers 11 may or may not be generally classified as a dielectric. In the former case, the material of the ceramic layers 11 may be the same as or different from the material of the dielectric layers 17. For example, the materials of the multiple ceramic layers 11 may be the same as or different from each other. Examples of a ceramic (the entirety or a main component thereof) and a dielectric include barium titanate ($BaTiO_3$), titanium dioxide ($TiO_2$), strontium titanate ($SrTiO_3$), calcium titanate ($CaTiO_3$), and calcium zirconate ($CaZrO_3$).

1.3.3. Conductor Layers (Dummy Electrodes and Base Electrodes)

As illustrated in FIGS. 2 and 3, each conductor layer 13 includes electrodes (21 or 23) positioned at the four corners of the capacitor 1 in plan view. The electrodes of the outermost conductor layers 13 will be referred to as base electrodes 21 (21A and 21B). The electrodes of the other conductor layers 13 will be referred to as dummy electrodes 23 (23A and 23B).

The dummy electrodes 23 and the base electrodes 21 may have the same configuration as each other except for their different positions in the D3 direction. Therefore, for convenience, in the description in this section, the dummy electrodes 23 may be described and description of the base electrodes 21 may be omitted. Unless otherwise noted and so long as no inconsistencies arise, the term dummy electrode 23 may be replaced by the term base electrode 21.

Each dummy electrode 23 is, for example, basically shaped like a layer having a constant thickness. Each dummy electrode 23 is, for example, exposed at side surfaces of the body 3 (more specifically, two side surfaces). The exposed part of each dummy electrode 23 is adhered to one external electrode 5. Each base electrode 21 constitutes part of the area of the top surface or bottom surface of the body 3. Each base electrode 21 is adhered to one external electrode 5.

The dummy electrodes 23 may have any positions, shapes, and dimensions in plan view. In the illustrated example, the positions, shapes, and dimensions of the dummy electrodes 23 are such that the dummy electrodes 23 approximately perfectly overlap the external electrodes 5 in planar perspective view (however, the external electrodes 5 are slightly wider). The dummy electrodes 23 have a rectangular shape (square in the illustrated example) with four sides parallel to the four sides of the rectangular (square in the illustrated example) ceramic layers 11.

As is clear from FIGS. 2 and 3, the dummy electrodes 23 partially overlap the region where the multiple internal electrodes 19 (internal electrodes 19 connected to different external electrodes 5 from each other) overlap each other (electrode bodies 19*a*) in planar perspective view. The above region can be said to be a region for securing capacitance. The overlapping area between this region and the dummy electrodes 23 may be of any size.

For example, the thickness of the dummy electrodes 23 may be greater than (illustrated example), the same as, or less than the thickness of the internal electrodes 19. In addition, the thickness of the dummy electrodes 23 may be smaller than, equal to, or greater than the thickness of the ceramic layers 11 (for example, the thickness between the electrodes). The thicknesses of the one or more dummy electrodes 23 and base electrodes 21 may be the same as or different from each other. In the illustrated example, the multiple dummy electrodes 23 have the same thickness as each other. In addition, the thickness of the base electrodes 21 (t3A and t3B) are greater than the thickness of the dummy electrodes 23.

The dummy electrodes 23 may be composed of any material. For example, the material of the dummy electrodes 23 may be the same as or different from the material of the internal electrodes 19. In any case, the description of the material of the internal electrodes 19 may be applied to the material of the dummy electrodes 23.

1.3.4. Embedded Structure of Base Electrodes

In the example in FIG. 3, the first base electrodes 21A are embedded from above in an outermost first ceramic layer 11A. Furthermore, the top surfaces of the first base electrodes 21A are flush with the top surface of the outermost first ceramic layer 11A (here, the top surface of the region where the first base electrodes 21A are not disposed; the same applies hereafter in this section).

When we say "flush", for example, the difference in position in the D3 direction between the top surface of each first base electrode 21A and the top surface of the first ceramic layer 11A may be 20% or less, 10% or less, or 5% or less of the thickness of the base electrodes 21. The position of a top surface may be reasonably specified as previously described, for example, the position may be an average value taken while excluding edges and other peculiarities, and may be expressed using the distance from a reference plane (flat or curved) that takes warpage into account (the same applies to the position of a bottom surface described below).

When a case is considered in which the top surfaces of the first base electrodes 21A and the top surface of the outermost first ceramic layer 11A are not flush, the amount of the former embedded in the latter may be any amount. The embedded amount is, for example, the distance from the position of the top surface of the outermost first ceramic layer 11A to the position of the bottom surface of each first base electrode 21A. For example, the embedded amount may be less than 50%, 50% or more, or 80% or more of the thickness of the base electrodes 21.

Any method may be used to embed the first base electrodes 21A in the outermost first ceramic layer 11A. For example, the outermost first ceramic layer 11A may be formed from two ceramic green sheet layers. Then, conductive paste, which will become the first base electrodes 21A, is placed on the top surface of the ceramic green sheet of the lower of the two layers, and holes (cut outs) are made in the regions where the first base electrodes 21A will be located in the ceramic green sheet of the upper of the two layers. Alternatively, in addition to or instead of such a method, the first base electrodes 21A may be embedded in the outermost first ceramic layer 11A by pressing conductive paste applied to the top surface of the ceramic green sheet.

The first base electrodes 21A have been used as an example, but the same applies to the second base electrodes 21B. The above description may be applied to the second base electrodes 21B by replacing the words "first", "A" and "top" with the words "second", "B" and "bottom", and so on. Unlike in the illustrated example, the base electrodes 21 may not be embedded in the outermost ceramic layer 11.

1.3.5. Examples of Asymmetry in Vertical Direction and Dimensions

As already described, the configuration of the first cover 9A and the configuration of the second cover 9B are asymmetrical with respect to the functional part 7. The term asymmetry used here does not include asymmetry due to unintended manufacturing errors. For example, if the capacitor 1 undergoes unintended warping during firing, which causes the first cover 9A and the second cover 9B to be asymmetrical in the vertical direction, this does not constitute the asymmetry referred to here.

In the example in FIG. 3, as already mentioned, the thickness t1A of the first cover 9A is greater than the thickness t1B of the second cover 9B, and the thickness t3A of the first base electrodes 21A is greater than the thickness t3B of the second base electrodes 21B. In this case, any values may be employed as the specific values of the thicknesses t1A, t1B, t3A, and t3B. Specific values for these thicknesses, as well as values for various dimensions other than these thicknesses, are given below.

The ranges of dimensions given below are merely examples, and values outside the ranges given below may be adopted. Examples of values of different types of dimensions may be used in any combination with each other. For example, any example values of the thickness of the body 3 and the thicknesses of the covers 9 may be used in combination with each other. The specific values given below may be applied to other embodiments described below (e.g., t1A=t1B and/or t3A=t3B), so long as no inconsistencies arise. The specific values given below may also take into account a different embodiment (e.g., without the dummy electrodes 23) from the illustrated example.

The length of the body 3 (or capacitor 1) in the D1 direction and the D2 direction may be 300 μm or more or 400 μm or more, and may be 2000 μm or less, 1000 μm or less, or 700 μm or less. These lower and upper limits may be used in any combination with each other. The length of the body 3 in the D3 direction may be 30 μm or more or 50 μm or more, and may be 500 μm or less, 200 μm or less, or 100 μm or less. These lower and upper limits may be used in any combination with each other.

For example, the thickness of the functional part 7 may be 30% or more, 40% or more, 50% or more, 60% or more, or 70% or more of the thickness of the body 3, and may be 90% or less, 80% or less, or 70% or less of the thickness of the body 3. The above lower and upper limits may be used in any combination with each other so long as no inconsistencies arise.

The boundaries between the functional part 7 and the covers 9 may be reasonably determined. For example, in the case where the material of the dielectric layers 17 and the material of the ceramic layers 11 are the same, the +D3-side surface of the internal electrode 19 located farthest toward the +D3 side and the −D3-side surface of the internal electrode 19 located farthest toward the −D3 side may be identified as the top surface and the bottom surface of the functional part 7.

The thickness (t1A or t1B) of each cover 9 may be 5% or more, 10% or more, or 15% or more of the thickness of the body 3, and may be 35% or less, 30% or less, 25% or less, 20% or less, or 15% or less of the thickness of the body 3. The above lower and upper limits may be used in any combination with each other so long as no inconsistencies arise. In addition, the thickness (t1A or t1B) of each cover 9 may be 5 μm or more, 10 μm or more, or 15 μm or more, and may be 50 μm or less, 30 μm or less, 25 μm or less, or 20 μm or less, 15 μm or less, or 10 μm or less. The above lower and upper limits may be used in any combination with each other so long as no inconsistencies arise.

The difference between the thicknesses of the covers 9 (t1A-t1B) may be 5% or more, 10% or more, or 15% or more of the thickness t1B of the second cover 9B, and may be 40% or less, 30% or less, or 20% or less of the thickness t1B of the second cover 9B. These lower and upper limits may be used in any combination with each other. In addition, the difference between the thicknesses of the covers 9 (t1A-t1B) may be 0.5 μm or more, 1.0 μm or more, or 1.5 μm or more, and may be 4.0 μm or less, 3.0 μm or less, or 2.5 μm or less. These lower and upper limits may be used in any combination with each other. The ratio of the thickness of the first cover 9A to the thickness of the second cover 9B (t1A/t1B) may be 1.05 or more, 1.10 or more, or 1.15 or more, and may be 1.40 or less, 1.30 or less, or 1.25 or less. These lower and upper limits may be used in any combination with each other.

The thickness of each base electrode 21 (t3A or t3B) may be 10% or more, 20% or more, 30% or more, or 40% or more of the thickness of the cover 9 to which the base electrode 21 belongs, and may be 90% or less, 60% or less, 50% or less, or 40% or less of the thickness of the cover 9 to which the base electrode 21 belongs. The above lower and upper limits may be used in any combination with each other so long as no inconsistencies arise. The thickness of each base electrode 21 (t3A or t3B) may be 1.0 μm or more, 2.0 μm or more, 3.0 μm or more, or 5.0 μm or more, and may be 20.0 μm or less, 10.0 μm or less, or 5.0 μm or less. The above lower and upper limits may be used in any combination with each other so long as no inconsistencies arise.

An example of the difference between the thicknesses of the base electrodes 21 (t3A−t3B) may be the same as the example of the difference between the thicknesses of the covers 9 (t1A–t1B) described above. In addition, the difference between the thicknesses of the base electrodes 21 (t3A–t3B) may be 20% or more, 30% or more, 50% or more, or 80% or more of the thickness t3B of the second base electrodes 21B, and may be 200% or less, 150% or less, 100% or less, or 80% or less of the thickness t3B of the second base electrodes 21B. The above lower and upper limits may be used in any combination with each other so long as no inconsistencies arise. The ratio of the thickness of the first base electrodes 21A to the thickness of the second base electrodes 21B (t3A/t3B) may be 1.2 or more, 1.4 or more, or 1.5 or more, and may be 2.5 or less, 2.0 or less, or 1.8 or less. These lower and upper limits may be used in any combination with each other.

The following ranges can be exemplified as thickness ranges close to the thicknesses of the covers 9 and the base electrodes 21 in Examples described later.

Thickness t1A of first cover 9A: 10 μm or more and 16 μm or less

Thickness t1B of second cover 9B: 8 μm or more and 14 μm or less

Thickness t3A of first base electrodes 21A: 4 μm or more and 8 μm or less

Thickness t3B of second base electrodes 21B: 2 μm or more and 6 μm or less

However, t1A>t1B and t3A>t3B.

The length of each base electrode 21 in the D1 direction may be, for example, 10% or more, 20% or more, or 30% or more of the length of the body 3 in the D1 direction, and may be 45% or less, 40% or less, or 30% or less of the length of the body 3 in the D1 direction. The above lower and upper limits may be used in any combination with each other so long as no inconsistencies arise. For example, the length of each dummy electrode 23 in the D1 direction may be 50 μm or more, 100 μm or more, or 150 μm or more, and may be 500 μm or less, 300 μm or less, or 200 μm or less. These lower and upper limits may be used in any combination with each other. Although examples of lengths in the D1 direction have been given, such lengths may be applied to lengths in the D2 direction. In addition, examples of the dimensions of the base electrodes 21 in this paragraph may be applied to the dummy electrodes 23.

The thickness of each dummy electrode 23 may be 5% or more, 10% or more, or 20% or more of the thickness of the cover 9 to which the dummy electrode 23 belongs, and may be 50% or less, 30% or less, or 20% or less of the thickness of the cover 9 to which the dummy electrode 23 belongs. The above lower and upper limits may be used in any combination with each other so long as no inconsistencies arise. For example, the thickness of the dummy electrodes 23 may be 0.3 μm or more, 0.5 μm or more, 1.0 μm or more, or 2.0 μm or more, and may be 10.0 μm or less, 5.0 μm or less, 3.0 μm or less, or 2.0 μm or less. The above lower and upper limits may be used in any combination with each other so long as no inconsistencies arise.

The thickness of each ceramic layer 11 (for example, between the electrodes) may be 5% or more, 10% or more, or 20% or more of the thickness of the cover 9 to which the ceramic layer 11 belongs, and may be 50% or less, 30% or less, or 20% or less of the thickness of the cover 9 to which the ceramic layer 11 belongs. The above lower and upper limits may be used in any combination with each other so long as no inconsistencies arise. In addition, the thickness of each ceramic layer 11 may be 1.0 μm or more or 2.0 μm or more, and 10.0 μm or less or 5.0 μm or less. These lower and upper limits may be used in any combination with each other.

1.4 External Electrodes

Each external electrode 5 is, for example, basically shaped like a layer having a constant thickness. As illustrated in FIG. 1, each external electrode 5 covers four surfaces (top surface, bottom surface, and two side surfaces) of the body 3, for example, substantially at the corners of the body 3 in plan view. This allows connection of one external electrode 5 to one lead-out electrode 19b on two side surfaces of the body 3, and also enables surface mounting using either the top surface or the bottom surface of the capacitor 1. In addition, the external electrodes 5 are adhered to parts of the conductor layers 13 exposed from the covers 9. The external electrodes 5 are also adhered to the ceramic layers 11 and the dielectric layers 17. The parts of the external electrode 5 on each surface may have any shapes and dimensions.

The external electrodes 5 may have any thickness. For example, the thickness of the external electrodes 5 may be greater than the thickness of the internal electrodes 19, the dummy electrodes 23, and the base electrodes 21. For example, the thickness of the external electrodes 5 may be 1.2 times or more, 2 times or more, or 3 times or more the thickness (t3A or t3B) of the base electrodes 21, and may be 10 times or less, 5 times or less, or 3 times or less the thickness (t3A or t3B) of the base electrodes 21. These lower and upper limits may be used in any combination with each other. For example, the thickness of the external electrodes 5 may be 3 μm or more, 5 μm or more, or 10 μm or more, and may be 30 μm or less, 20 μm or less, or 10 μm or less. The above lower and upper limits may be used in any combination with each other so long as no inconsistencies arise.

The material of the external electrodes 5 is, for example, a metal. The specific type of metal may be any metal, and, for example, is entirely or mainly composed of a base metal (e.g. Ni and/or Cu). The external electrodes 5 may be configured by stacking different materials as needed. For example, the external electrodes 5 may consist of layers of Cu, Ni, and Sn from the side near the base electrodes 21. The material of the external electrodes 5 may be the same as or different from the material (for example, the main component) of the internal electrodes 19, the dummy electrodes 23 and/or the base electrodes 21. The external electrodes 5 may, for example, be configured to not contain the same material (co-material) as the material (e.g., main component) of the ceramic layers 11.

As indicated by the symbols in FIG. 3, in the description of an embodiment, the parts of the external electrodes 5 that cover the first cover 9A (at least a portion thereof) may be referred to as first external electrodes 5a, and the parts of the external electrodes 5 that cover the second cover 9B (at least a portion thereof) may be referred to as second external electrodes 5b.

2. METHOD OF MANUFACTURING CAPACITOR

Various manufacturing methods may be used to manufacture the capacitor 1. For example, the method of manufacturing the capacitor 1 may be the same as or similar to known methods, except for the setting of specific dimensions. An example of a manufacturing method will be described below.

Figure 4:
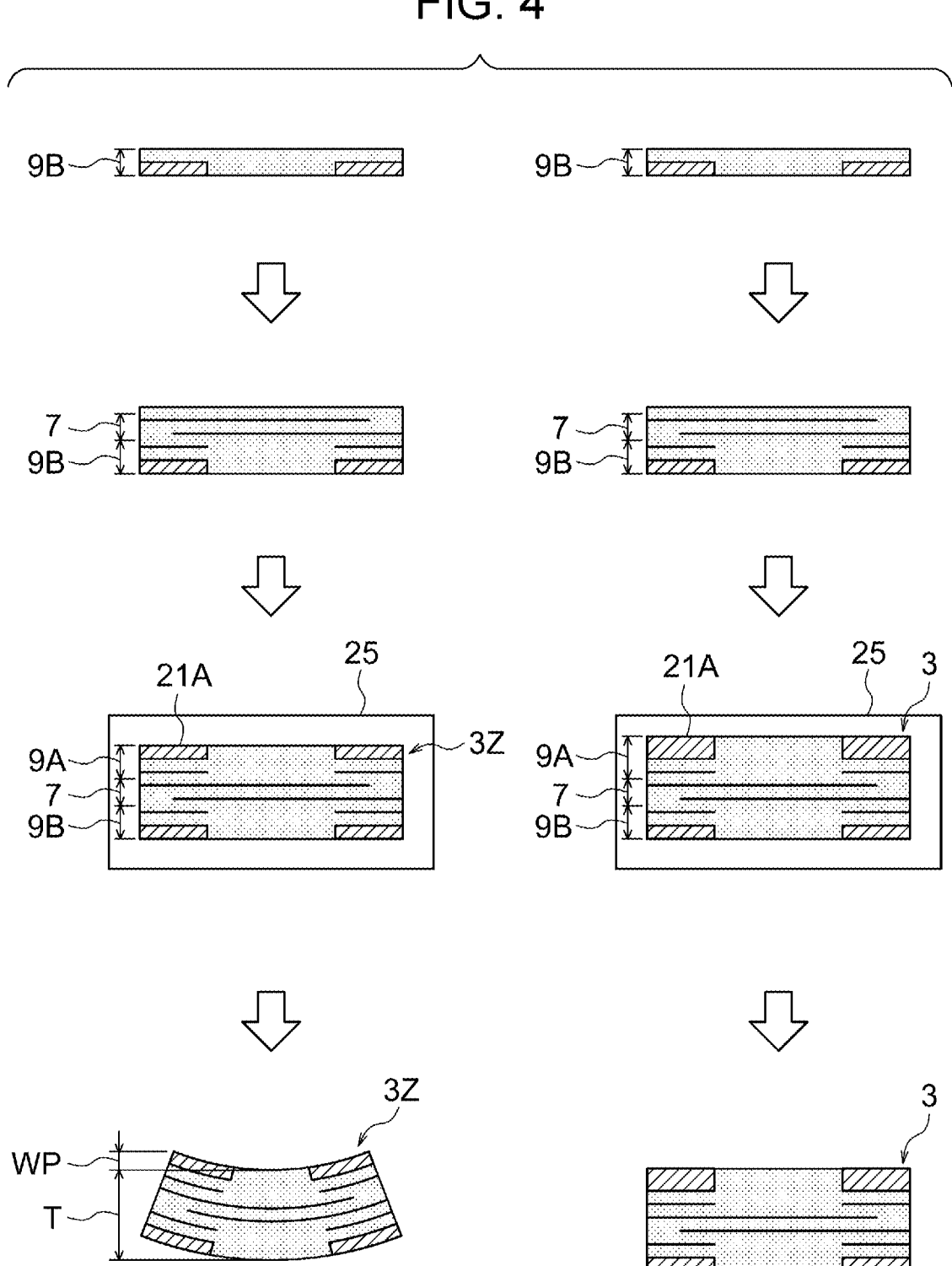
FIG. 4 is a schematic diagram for describing a method of manufacturing a capacitor.

FIG. 4 is a schematic diagram illustrating a manufacturing method. The left side of FIG. 4 illustrates a manufacturing method for a capacitor (more specifically, a body 3Z) according to a Comparative Example. The right side of FIG.

4 illustrates a manufacturing method for the capacitor 1 (more specifically, the body 3) according to an embodiment.

First, ceramic green sheets, which will become the dielectric layers 17 and the ceramic layers 11, are fabricated. Next, conductive paste that will become the internal electrodes 19, the dummy electrodes 23, or the base electrodes 21, is applied to (for example, printed on) the ceramic green sheets.

Next, as illustrated in the first to third sections from the top in FIG. 4, a multilayer body (unfired body 3) that will become the body 3 (3Z) is fabricated by stacking the ceramic green sheets on top of one another. The sheets may be stacked in any order. In the illustrated example, the ceramic green sheets are stacked one by one, starting from the lowermost (second cover 9B side) ceramic green sheet. Unlike in the illustrated example, for example, the ceramic green sheets may be stacked one by one, starting from the uppermost (first cover 9A side) ceramic green sheet, and/or some of the sheets may be stacked several at a time.

As already mentioned, one ceramic layer 11 may consist of two or more ceramic green sheets. As is clear from this, when we say that ceramic green sheets and conductive paste are stacked in an alternating manner, the ceramic green sheets and conductive paste do not need to be stacked in an alternating manner one layer at a time. However, as in the case of the ceramic layers 11, ceramic green sheets that are stacked without intervening conductive paste may be considered as a single layer.

Up to the fabrication of the multilayer body, the steps are carried out, for example, at the size of a mother substrate from which a large number of bodies 3 will be obtained. After fabrication of the multilayer body, the mother substrate containing the multilayer bodies is divided (e.g., cut) into pieces of a size that generally corresponds to the size of the body 3.

Next, the multilayer body having the size of the body 3 is fired as illustrated in the third section from the top in FIG. 4. Any firing method may be used. In the illustrated example, an electric furnace 25 is schematically illustrated. In addition to this, firing may be performed, for example, by irradiating the multilayer body with microwaves.

Degreasing may be performed prior to firing. Firing may be performed, for example, in a reducing atmosphere. Re-oxidation heat treatment may be performed after firing. The body 3 may be polished (e.g., barrel polished) before and/or after firing. In the polishing, for example, the ridges of the body 3 may be chamfered and the side surfaces of the body 3 may be polished.

After firing the body 3, the external electrodes 5 are formed. The external electrodes 5 may be formed using various methods. For example, a metal may be deposited on the surfaces of base electrodes 21 (top surface or bottom surface, and side surfaces), the exposed portions of the dummy electrodes 23 exposed from the side surfaces of the body 3, and the exposed portions of the internal electrodes 19 exposed from the side surfaces of the body 3 by performing electroless plating and/or electrolytic plating. For example, thin film forming methods such as dipping, printing, CVD (chemical vapor deposition) or PVD (physical vapor deposition) may be employed. As is clear from the above description, the base electrodes 21, the dummy electrodes 23 and the internal electrodes 19 may or may not contribute to metal deposition.

In the body 3Z according to the Comparative Example, unlike in the body 3 according to an embodiment, the thickness of the first cover 9A is the same as the thickness of the second cover 9B, and the thickness of the first base electrodes 21A is the same as the thickness of the second base electrodes 21B. As illustrated at the bottom left of FIG. 4, the body 3Z is prone to warping with the top of the body 3Z becoming concave during firing.

Factors that cause warpage include the following, for example. In the process of stacking ceramic green sheets, relatively low-pressure pressing is applied to each of the ceramic green sheets. This pressing, for example, contributes to pressing the ceramic green sheets together. The lower a ceramic green sheet is, the more times the ceramic green sheet will experience pressing, and the higher the density of ceramic particles in the ceramic green sheet will become. Conversely, the higher a ceramic green sheet is, the lower the density of ceramic particles in the ceramic green sheet will be. As a result, during sintering, the degree of shrinkage increases in the upward direction. Consequently, the compressive stress in a direction along the layers increases in the upward direction, resulting in upward concave warpage.

As previously mentioned, in the present disclosure, asymmetry caused by unintended manufacturing errors is not the focus when determining whether there is asymmetry between the configuration of the first cover 9A and the configuration of the second cover 9B with respect to the functional part 7. The above-mentioned differences in the density of ceramic particles resulting from the stacking order and pressing are manufacturing errors. Therefore, even if the first cover 9A and second cover 9B differ with respect to their microstructures after firing due to differences in density that were present before firing (even if such known technology exists), the "asymmetry" referred to here will be determined to not be present.

3. EXAMPLES OF ACTIONS DUE TO ASYMMETRY AND EXAMPLES OF PARTICLE SIZE

As illustrated in the bottom section of FIG. 4, warping due to firing is reduced in the body 3 according to an embodiment compared to the body 3Z of a Comparative Example. The reason for this is as follows, for example.

Figure 5:
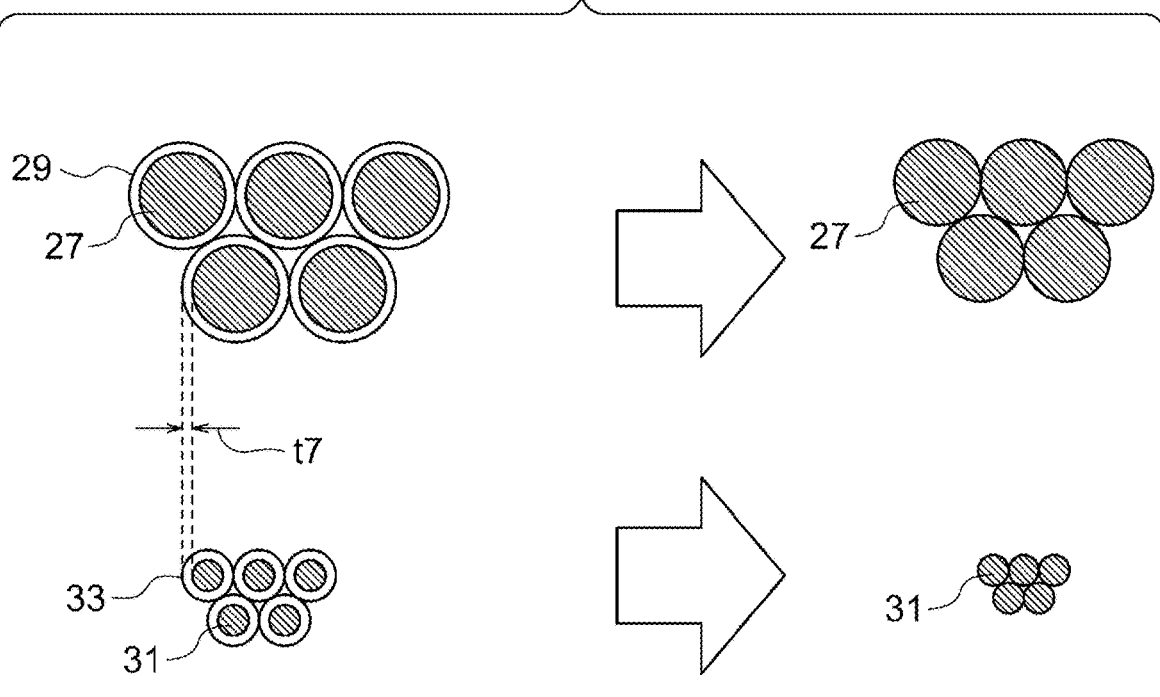
FIG. 5 is a schematic diagram for describing an example of an action of an embodiment.

FIG. 5 is a schematic illustration of an example of the reason why warpage is reduced by making the first base electrodes 21A thicker than the second base electrodes 21B.

The top part of FIG. 5 illustrates metal particles 27 contained in the conductive paste (base electrodes 21) and an organic layer 29 composed of a binder and so forth. The bottom part illustrates ceramic particles 31 contained in a ceramic green sheet (ceramic layer 11) and an organic layer 33 composed of a binder and so forth. In FIG. 5, the left side illustrates the state before firing, and the right side illustrates the state after firing.

In general, the particle size of the metal particles 27 is larger than that of the ceramic particles 31. In addition, the same material or similar materials are often used for the organic layer 29 and the organic layer 33. Even though the particle sizes of the metal particles 27 and the ceramic particles 31 are different from each other, thicknesses t7 of the organic layers 29 and 33 are generally the same.

Therefore, the surface area of the particles relative to the volume of the particles is smaller in the conductive paste than in the ceramic green sheet, and consequently, the volume of organic material relative to the volume of the particles is smaller in the conductive paste than in the ceramic green sheet. Then, when the organic material disappears as a result of the firing, the volume fraction of organic material that disappears is smaller in the conductive paste than in the ceramic green sheet. As a result, the degree of shrinkage of the conductive paste is smaller than the degree of shrinkage of the ceramic green sheet.

On the other hand, as illustrated in FIG. 3, the volume fraction of conductive paste in the first cover 9A before firing is larger than the volume fraction of conductive paste in the second cover 9B before firing due to the fact that the first base electrodes 21A are thicker than the second base electrodes 21B. Therefore, the amount of shrinkage in a direction along the layers in the first cover 9A is smaller than the amount of shrinkage in a direction along the layers in the second cover 9B. As a result, upward concave warpage of the body 3 is reduced.

If the first cover 9A is thicker than the second cover 9B, one might intuitively think that the compressive force applied by the first cover 9A to the functional part 7 (compressive stress of the first cover 9A×thickness of the first cover 9A) would increase in accordance with the increased thickness, and upward concave warpage would be promoted. In reality, however, warpage is reduced as described in the estimation mechanism above and as illustrated in an Example below. Thus, the capacitor 1 according to an embodiment is revolutionary because the capacitor 1 produces an action that goes against what one would intuitively expect.

Although not depicted in FIG. 5, firing causes the metal particles 27 and ceramic particles 31 to grow. However, since the difference in diameter between the two types of particles is relatively large, the size relationship before firing is usually maintained after firing. Therefore, whether or not the above action has occurred can be determined from the size of the particles after firing.

The specific values of the particle sizes of the metal particles and the ceramic particles may be any values. For example, the average particle size of the metal particles contained in the conductive paste that will become the base electrodes 21 and the dummy electrodes 23 may be 100 nm or more and 500 nm or less, or 180 nm or more and 370 nm or less. The average particle size of the metal particles contained in the conductive paste that will become the internal electrodes 19 may be 50 nm or more and 200 nm or less. The average particle size of the ceramic particles contained in the ceramic green sheets that will become the dielectric layers 17 and the ceramic layers 11 may be 20 nm or more and 80 nm or less. The average particle size of the metal particles contained in the conductive paste that will become the base electrodes 21 and the dummy electrodes 23 may be 2 times or more, 5 times or more, or 8 times or more the average particle size of the ceramic particles contained in the ceramic green sheets that will become the ceramic layers 11 and the dielectric layers 17.

For example, the average particle size of the metal particles (after firing) of the base electrodes 21 and the dummy electrodes 23 may be 200 nm or more and 800 nm or less, or 350 nm or more and 400 nm or less. For example, the average particle size of the metal particles (after firing) contained in the internal electrodes 19 may be 100 nm or more and 300 nm or less, or 150 nm or more and 200 nm or less. The average particle size of the ceramic particles (after firing) contained in the dielectric layers 17 and the ceramic layers 11 may be 50 nm or more and 150 nm or less, or 70 nm or more and 80 nm or less. The average particle size of the metal particles (after firing) contained in the base electrodes 21 and the dummy electrodes 23 may be 2 times or more, 5 times or more, or 8 times or more the average particle size of the ceramic particles contained in the ceramic layers 11 and dielectric layers 17.

The ratio of organic material to metal particles or ceramic particles before firing may take any value. For example, when there are 100 parts by mass of metal particles, 10 parts by mass or more and 40 parts by mass or less of organic material may be mixed into the conductive paste that will become the base electrodes 21, the dummy electrodes 23, and the internal electrodes 19. When there are 100 parts by mass of ceramic particles, 10 parts by mass or more and 40 parts by mass or less of organic material may be mixed into the ceramic green sheets that will become the ceramic layers 11 and the dielectric layers 17.

4. EXAMPLES

Bodies of capacitors according to Comparative Examples and an Example were fabricated and their warpage was measured. As a result, the Example was confirmed to have reduced warpage compared to the Comparative Examples. This is described more specifically below.

Comparative Examples and an Example with different configurations from each other with respect to vertical symmetry were set up as follows.

Comparative Example 1: Vertically symmetrical capacitor

Comparative Example 2: Capacitor with thicker second cover 9B and second base electrodes 21B than in Comparative Example 1

Example: Capacitor with thicker first cover 9A and first base electrodes 21A than in Comparative Example 1

In the Comparative Examples and Example, matters not specifically mentioned are the same as or similar to those in the capacitor 1 of an embodiment.

The above Comparative Example 1, Comparative Example 2, and Example were set up for capacitor bodies having different reference sizes from each other. For convenience, Comparative Example 1, Comparative Example 2 and Example may be referred to as follows using "A" or "B".

Comparative Example 1A, Comparative Example 2A, and Example A: Size A

Comparative Example 1B, Comparative Example 2B, and Example B: Size B

Sizes A and B are as follows.

Size A: 600 μm (D1 direction)×600 μm (D2 direction)×90 μm (D3 direction)

Size B: 500 μm (D1 direction)×500 μm (D2 direction)×65 μm (D3 direction)

These sizes are the design values of the body (after firing) of the capacitor according to Comparative Example 1.

The thicknesses of the covers 9 and the base electrodes 21 according to the Comparative Examples and Example are as follows.

Thickness of each cover 9 in Comparative Example 1, thickness of first cover 9A in Comparative Example 2, and thickness of second cover 9B in Example: 10 μm Thickness of second cover 9B in Comparative Example 2 and first cover 9A in Example: 12 μm Thickness of each base electrode 21 in Comparative Example 1, thickness of first base electrodes 21A in Comparative Example 2, and thickness of second base electrodes 21B in Example: 3 μm Thickness of second base electrodes 21B in Comparative Example 2 and thickness of first base electrodes 21A in Example: 5 μm The above thicknesses of the covers 9 and the base electrodes 21 are common to sizes A and B, and are design values after firing.

The average particle sizes of the metal particles and the ceramic particles before and after firing fall within the ranges given earlier (or the narrower range if more than one range is given). The material of the metal particles contained in the conductive paste (13 and 19) was Ni. The material of the ceramic particles contained in the ceramic green sheets (11 and 17) was $BaTiO_3$.

Evaluation of warpage was carried out as follows. The difference between the lowest position and the highest position of the top surface was measured as an amount of warpage WP as depicted at the bottom left of FIG. 4. WP was divided by a thickness T of the body 3 and multiplied by 100 to express the value in units of %. For each of the Comparative Examples and the Example, several (10) samples were fabricated and the frequency distribution of WP/T× 100(%) was examined.

Figure 6:
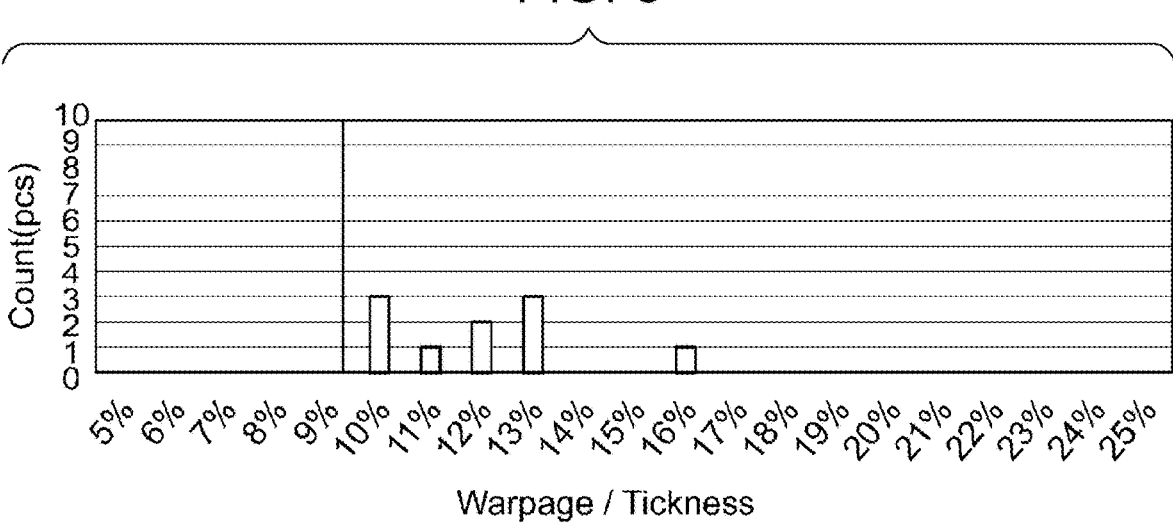
FIG. 6 is a diagram illustrating warping of capacitors according to Comparative Examples and an Example.
Figure 6:
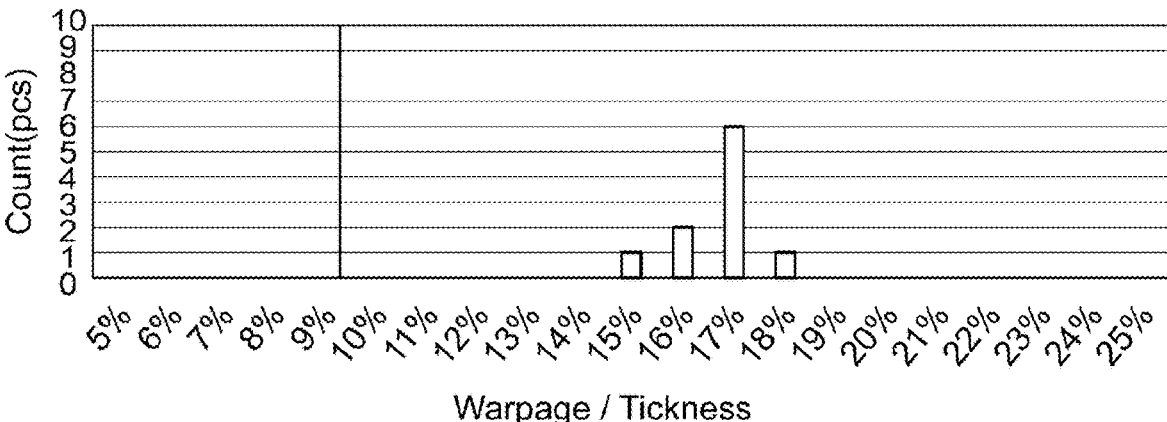
Figure 6:
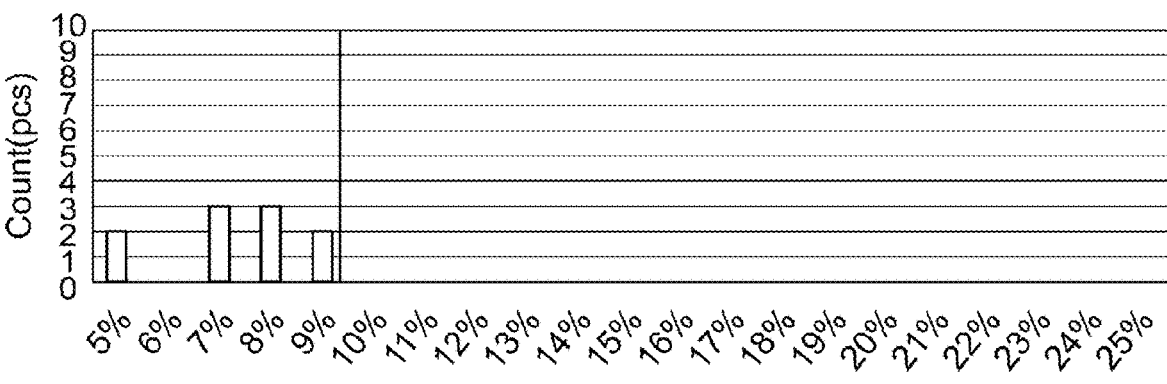
Figure 7:
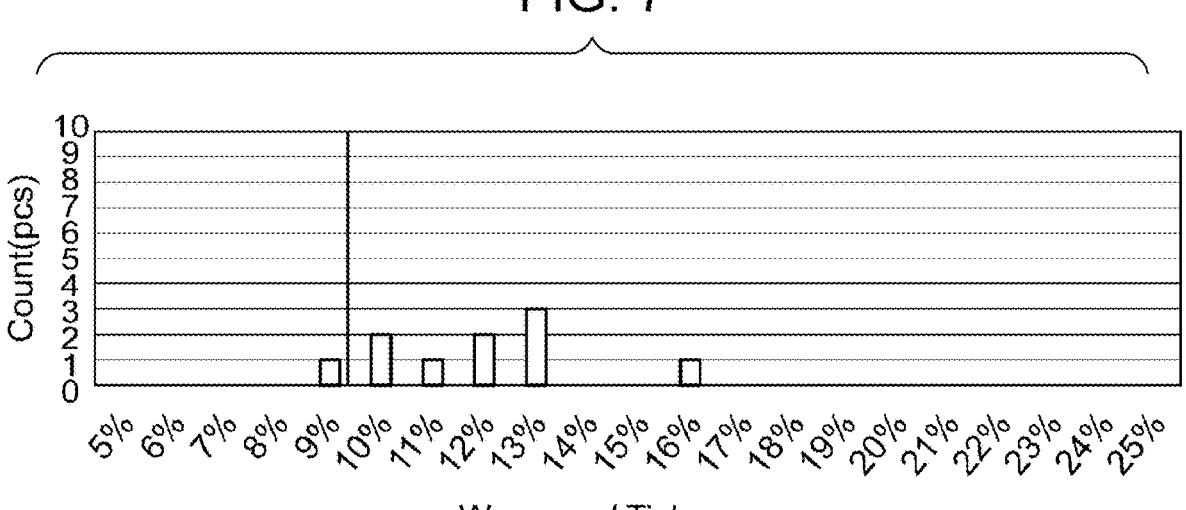
FIG. 7 is a diagram illustrating warping of capacitors according to other Comparative Examples and another Example.
Figure 7:
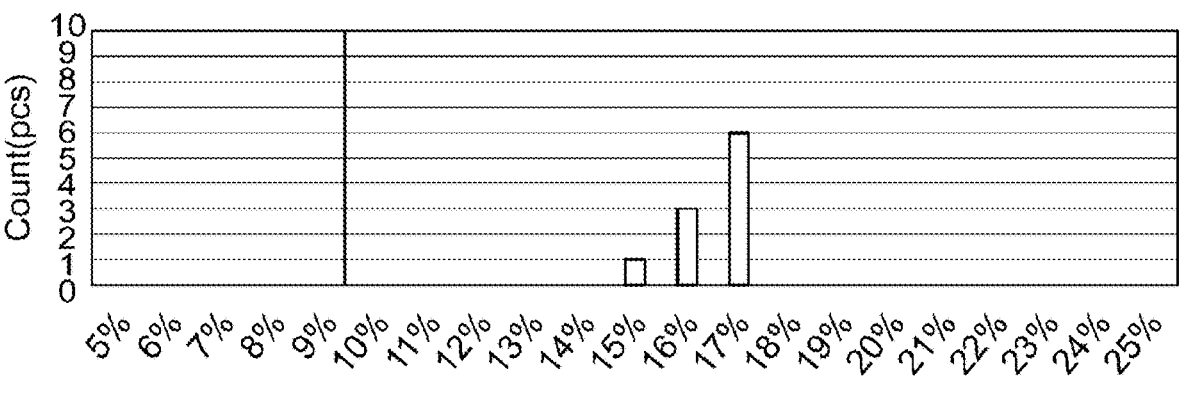
Figure 7:
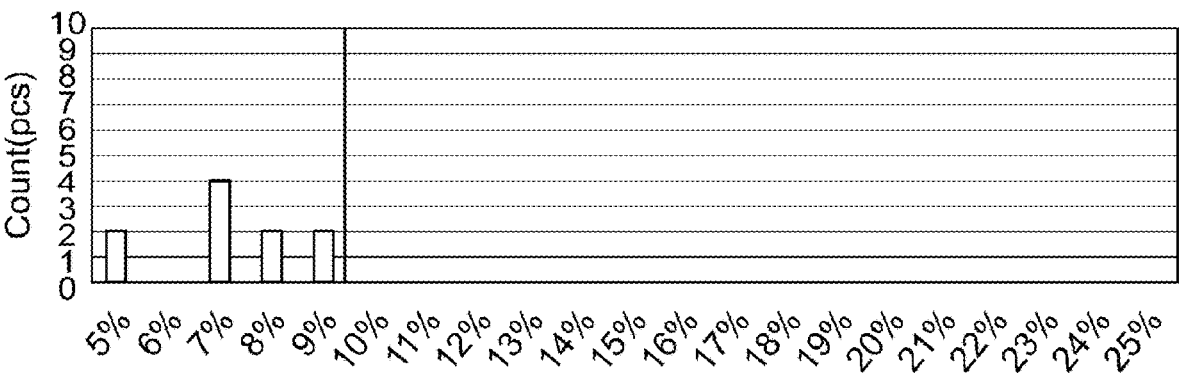

FIGS. 6 and 7 are diagram illustrating the results of the above evaluation. In these figures, the horizontal axis represents WP/T×100(%) described above. The vertical axis represents number of samples. FIG. 6 corresponds to the Comparative Examples and Example of size A. FIG. 7 corresponds to the Comparative Examples and Example of size B. In each figure, the top section corresponds to Comparative Example 1, the middle section corresponds to Comparative Example 2, and the bottom section corresponds to Example.

As illustrated in these figures, there is a high probability that warpage will be greater in Comparative Example 2 than in Comparative Example 1. On the other hand, there is a high probability that warpage will be smaller in Example than in Comparative Example 1.

More specifically, focusing on size A (FIG. 6), in Example A, all samples have warpage of 9% or less, whereas in Comparative Example 1A, there are no samples with warpage of 9% or less. In addition, focusing on size B (FIG. 7), only one sample has warpage of 9% or less in Comparative Example 1B, whereas all samples have a warpage of 9% or less in Example B.

5. OTHER EMBODIMENTS

5.1. Other Examples Related to Vertical Asymmetry

Figure 8:
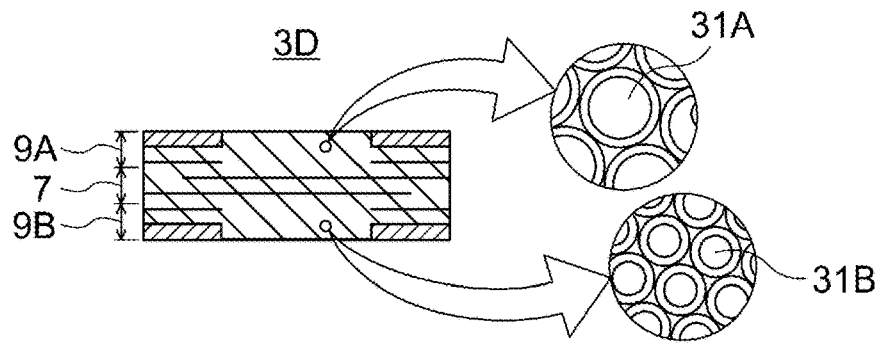
FIG. 8 is a sectional view illustrating another example relating to asymmetry of a capacitor in a vertical direction.

FIG. 8 is a sectional view illustrating other examples related to the asymmetry of the two covers 9. The previously mentioned examples relating to asymmetry (asymmetry in terms of thickness of the covers 9 and/or base electrodes 21) and other examples described below may be combined with each other in any manner.

In a body 3A illustrated in the top section of FIG. 8, a length L1A of a first conductor layer 13A is greater than a length L1B of a second conductor layer 13B in a certain cross-section. As a result, for example, the volume fraction of conductive paste in the first cover 9A before firing is greater. Consequently, upward concave warpage is reduced by a mechanism similar to that in the case where the first base electrodes 21A are made thicker.

As illustrated in this example, asymmetry in the vertical direction may be achieved via differences in the configurations of the first conductor layer 13A and the second conductor layer 13B in the lateral direction. The specific difference between and ratio of the lengths L1A and L1B may take any values. The objects that have different configurations from each other in the lateral direction may be any objects and may be, for example, the base electrodes 21 and/or some or all of the dummy electrodes 23.

In a body 3B illustrated in the second section from the top in FIG. 8, a thickness t9A of first dummy electrodes 23A is greater than a thickness t9B of second dummy electrodes 23B. Consequently, upward concave warpage is reduced by a mechanism the same as or similar to that in the case where the first base electrodes 21A are made thicker, for example.

In the illustrated example, only one dummy electrode 23 in each cover 9 is illustrated. When the number of dummy electrodes 23 in each cover 9 is two or more, t9A>t9B may hold true for all the dummy electrodes 23 or only for some of the dummy electrodes 23. The specific difference between and ratio of the thicknesses t9A and t9B etc. may take any values. The description of the difference between and ratio of thicknesses t3A and t3B for the base electrodes 21 may be applied to the difference between and ratio of thicknesses t9A and t9B.

In a body 3C illustrated in the third section from the top in FIG. 8, the number of layers of the first conductor layers 13A (first dummy electrodes 23A) is larger than that of the second conductor layers 13B (second dummy electrodes 23B). As a result, for example, the volume fraction of conductive paste in the first cover 9A before firing is increased, and upward concave warpage is reduced through a mechanism similar to that in the case where the first base electrodes 21A are made thicker.

In the illustrated example, the difference between the numbers of layers of the first dummy electrodes 23A and the second dummy electrodes 23B is one layer. However, the difference between the numbers of layers may be two or more layers. In addition, the ratio of the number of layers of the first dummy electrodes 23A to the number of layers of the second dummy electrodes 23B (two fold in the illustrated example) may take any value.

In a body 3D illustrated in the lowermost section of FIG. 8, the average particle size of ceramic particles 31A of a ceramic green sheet constituting the first cover 9A is greater than that of ceramic particles 31B of a ceramic green sheet constituting the second cover 9B. As is clear from the description of FIG. 5, in this case, the degree of shrinkage of the first cover 9A is smaller than would be the case if ceramic particles 31B were used instead of the ceramic particles 31A. As a result, upward concave warpage is reduced.

In the illustrated example, the average particle size of the ceramic particles is made different for the first cover 9A and the second cover 9B. Instead of or in addition to the average particle size of ceramic particles, the average particle size of metal particles in the conductor layers 13 may be made different for the first cover 9A and the second cover 9B. The difference between and ratio of the average particle sizes may take any values.

Although not specifically illustrated, the solid content ratio of the ceramic green sheets and/or conductive paste in the first cover 9A may greater than that in the second cover 9B in order to reduce upward concave warpage. The proportion of co-material (ceramic particles) contained in the conductive paste may be made lower for the first cover 9A than for the second cover 9B in order to reduce upward concave warpage.

As is clear from FIG. 3, and the examples from the first to third sections from the top in FIG. 8, the asymmetry in the vertical direction may be achieved by increasing the volume fraction of the conductor layers 13 (conductive paste in unfired state) to be greater in the first cover 9A than in the second cover 9B.

As is clear from FIG. 3, and the examples from the second section and third section from the top in FIG. 8, the asymmetry in the vertical direction may be achieved by making the total thickness of the conductor layers 13 (conductive paste in unfired state) greater in the first cover 9A than in the second cover 9B.

In the first cover 9A and the second cover 9B, layers that the same number of layers (11 or 13) as each other from the functional part 7 will be referred to as layers corresponding to each other. The asymmetry in the vertical direction may be realized by making at least one selected from a group consisting of the thicknesses of the layers corresponding to each other, the materials of the layers corresponding to each other, and the numbers of conductor layers 13 different from each other, as is clear from the examples from FIG. 3, and from the second section to the bottommost section from the top in FIG. 8 and so forth. If the total numbers of conductor layers 13 are different from each other in the first cover 9A and the second cover 9B, there is no need to identify the layers corresponding to each other in the first cover 9A and the second cover 9B.

In the examples in FIG. 3 and the second and third sections from the top in FIG. 8, the thickness of the first cover 9A (from another perspective, the thickness of the first ceramic layer 11A in the region where the first conductor layer 13A is not disposed) is increased as the first conductor layer 13A is made thicker. However, the first conductor layer 13A may be made thicker than the second conductor layer 13B while keeping the thickness of the first cover 9A the same as that of the second cover 9B.

5.2. Another Example Related to Terminals

Figure 9:
FIG. 9 is a perspective view illustrating another example relating to the arrangement of terminals.
Figure 9:
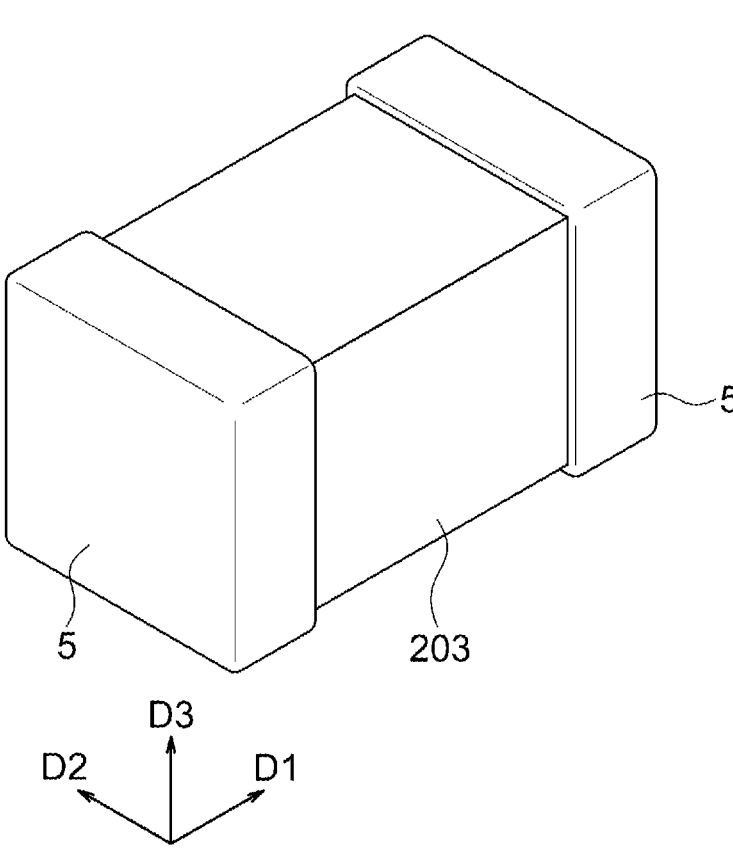

FIG. 9 is a perspective view of a capacitor 201 according to another example. FIG. 3 may be referenced as a D1D3 cross-section of the capacitor 201 (body 203).

Broadly speaking, the capacitor 201 differs from the four-terminal-type capacitor 1 in that the capacitor 201 is a two-terminal-type capacitor. The vertical asymmetry described so far may be applied to the capacitor 201 as well. Although not specifically illustrated, the vertical asymmetry may also be applied to a capacitor 1 of another terminal type such as a three-terminal type.

5.3. Another Example of Electronic Component Other than Capacitor

Although not specifically illustrated, yet another configuration is described below.

The capacitor may include exterior resin that covers the entirety of the configuration illustrated in FIG. 1 or FIG. 9, and lead wires that extend from the exterior resin and are connected to the external electrodes 5. From another perspective, the capacitor may be a through-hole mounting type capacitor rather than a surface mounting type capacitor. In this case, one external electrode 5 may only cover one side surface. The capacitor may be distributed from one factory to another factory without the external electrodes 5 (i.e., body 3).

The two types of internal electrodes 19, which are connected to different external electrodes 5, may be stacked two at a time in an alternating manner, rather than one at a time in an alternating manner. In this case, for example, the thickness of the dielectric layers 17 between the internal electrodes 19 connected to the same external electrode 5 and facing each other may be made smaller than the thickness of the dielectric layers 17 between the internal electrodes 19 connected to different external electrodes 5 and facing each other. As is clear from this description, the multiple dielectric layers 17 do not need to have the same shape and size.

In addition, the two types of internal electrodes 19, which are connected to different external electrodes 5, do not need to face each other. For example, the two types of internal electrodes 19, which are connected to different external electrodes 5, may be provided in the same layer, and an internal electrode 19 facing the above two types of internal electrodes 19 may be provided, thereby forming a circuit in which two parallel plate capacitors are connected in series with each other. A circuit in which three or more parallel plate capacitors are connected in series with each other may also be configured.

In the example in FIG. 9, the internal electrodes 19 are sandwiched between dielectric layers 17 that extend on both sides (outside) in the D2 direction beyond the two long sides, parallel to the D1 direction, of the internal electrodes 19, so that the two long sides of the internal electrodes 19 are not exposed from the −D2 and +D2 side surfaces of the body 203. However, the configuration whereby the long sides are not exposed may be realized by stacking other dielectric layers on the −D2 and +D2 side surfaces of the multilayer body consisting of the dielectric layers 17 and ceramic layers 11. From another perspective, the body does not need to have a multilayer structure throughout.

An electronic component is not limited to a capacitor. For example, an electronic component may be a multilayer electronic component other than a capacitor, or may be a non-multilayer electronic component. Examples of multilayer electronic components include multilayer inductors, multilayer varistors, multilayer ferrite beads, multilayer thermistors, and multilayer filters. There are a wide variety of electronic components that are not multilayer electronic components, for example, ICs (integrated circuits).

A multilayer electronic component includes, for example, a functional part (7) that consists of non-conductors (e.g., dielectric layers 17) and conductors (e.g., internal electrodes 19) stacked in an alternating manner. In this configuration, for example, the covers 9, which each include one or more ceramic layers 11 and one or more conductor layers 13, can be formed as an extension of the process of forming the functional part. Therefore, even if the configuration of the covers 9 in an embodiment is adopted, the likelihood of the manufacturing process becoming complicated is reduced.

A multilayer ceramic filter may, for example, include an LC circuit. As is clear from this example, a multilayer electronic component may realize two or more functions (capacitor and inductor). The areas that realize different functions may be different from each other in planar perspective view and/or different from each other in lateral perspective view.

The functional part (7) does not need to have a vertically symmetrical configuration. Warpage may be caused by asymmetry of the functional part. The asymmetry of the two covers 9 may contribute to reducing such warping.

SUMMARY OF EMBODIMENTS

Hereafter, we will extract the configuration of an electronic component of an embodiment and describe the effects of the extracted configuration. However, the effects described below do not necessarily need to be achieved. Hereafter, the symbols of one of the embodiments will be used for convenience. However, the matters described below may be applied to an embodiment other than the embodiment in which the symbols are used, as long as no contradictions or the like arise.

The capacitor 1 (an example of an electronic component) according to an embodiment includes the functional part 7, the first cover 9A overlapping the functional part 7 from a +D3 side (an example of a first side in a first direction) and a second cover 9B overlapping the functional part 7 from a −D3 side (an example of a second side). The first cover 9A includes one or more first ceramic layers 11A and one or more first conductor layers 13A stacked in an alternating manner with the one or more first ceramic layers 11A. The second cover 9B includes one or more second ceramic layers 11B and one or more second conductor layers 13B stacked in an alternating manner with the one or more second ceramic layers 11B. The configuration of the first cover 9A and the configuration of the second cover 9B are asymmetrical with each other with respect to the functional part 7.

A method of manufacturing the capacitor 1 according to an embodiment includes stacking ceramic green sheets (11) to obtain an unfired multilayer body (body 3) (first to third sections from the top in FIG. 4), and firing the unfired multilayer body (body 3) (third section from the top in FIG. 4). The unfired body 3 includes the functional part 7 (e.g., unfired), an unfired first cover 9A that overlaps the functional part 7 from the +D3 side, and an unfired second cover 9B that overlaps the functional part 7 from the –D3 side. The unfired first cover 9A includes one or more first ceramic green sheets (11A) and one or more first conductive paste (13A) layers stacked in an alternating manner with the one or more first ceramic green sheets (11A). The unfired second cover 9B includes one or more second ceramic green sheets (11B) and one or more second conductive paste (13B) layers stacked in an alternating manner with the one or more second ceramic green sheets (11B). A configuration of the unfired first cover 9A and a configuration of the unfired second cover 9B are asymmetrical with each other with respect to the functional part 7.

In this case, for example, warping during the firing can be reduced, as already described. The frequencies or phases of structural or electromagnetic vibrations generated or reflected in the first and second covers 9A and 9B may be made different from each other, and this will reduce the likelihood of unintended resonance being generated within the functional part 7. In a case where the functional part 7 is not vertically asymmetrical, the asymmetry can be compensated for with respect to warpage during the manufacturing process or with respect to strength after the manufacturing process.

The first cover 9A and second cover 9B may differ from each other with respect to at least one selected from a group consisting of the thicknesses of the layers (11 and/or 13) corresponding to each other, the materials of the layers (11 and/or 13) corresponding to each other, and the numbers of conductor layers 13.

In this case, the likelihood of the conductor layers 13 exerting unintended electromagnetic effects on the functional part 7 is more easily reduced compared to, for example, a case where asymmetry in the vertical direction is achieved via the dimensions of the conductor layers 13 in the planar direction, as in the body 3A in the topmost section of FIG. 8. Alternatively, the possibility of unintended electromagnetic effects are easily predicted. In addition, design changes from a reference design (Comparative Example 1) are easily made.

The first cover 9A may be thicker than the second cover 9B. The total thickness of the one or more first conductor layers 13A may be greater than the total thickness of the one or more second conductor layers 13B.

In this case, for example, as already mentioned, the volume fraction of conductive paste in the first cover 9A can be made relatively large in order to reduce warpage. In addition, the need to make the first ceramic layers 11A thinner is reduced because the first cover 9A is made thicker along with the first conductor layers 13A being made thicker. As a result, insulation is easily ensured. In addition, design changes from the reference design (Comparative Example 1) or changes to the manufacturing process are easily made.

Among the one or more first conductor layers 13A, the thickness of the first conductor layer 13A (first base electrode 21A) located farthest toward the +D3 side may be greater than the thickness of the second conductor layer 13B (second base electrode 21B) located farthest toward the –D3 side among the one or more second conductor layers 13B.

In this case, the vertical asymmetry is realized at positions farthest from the functional part 7, and as a result, the likelihood of unintended effects in the functional part 7 due to the asymmetry is reduced. The farther away a ceramic green sheet is from the neutral plane of warpage (deflection), the more easily the compressive force in a direction along the layer acts as a moment of warpage. By increasing the thickness of the outermost conductor layer 13, such compressive forces can be reduced.

The thickness of the functional part 7 in the D3 direction may be smaller than each of the length in the D1 direction (an example of the second direction) and the length in the D2 direction (an example of the third direction), which are perpendicular to the D3 direction.

In this case, for example, warping in the D3 direction is more likely to occur. Therefore, a configuration that can contribute to the reduction of warpage in an embodiment is effective.

The capacitor 1 may further includes the first external electrodes 5a covering the first cover 9A and the second external electrodes 5b covering the second cover 9B. Each of the one or more first conductor layers 13A may include a part exposed to outside the first cover 9A and bonded to the corresponding first external electrode 5a. Each of the one or more second conductor layers 13B may include a part exposed to outside the second cover 9B and bonded to the corresponding second external electrodes 5b. The above bonded parts may be, for example, the surface of the base electrode 21 on the opposite side from the functional part 7 and the end portion of the base electrode 21 in plan view, and the end portion of the dummy electrode 23 in plan view.

In this case, for example, the conductor layers 13, which can be made to contribute to reducing warpage by adjusting their thicknesses etc., can contribute to improving the bonding strength between the external electrodes 5 and the body 3, and/or can contribute to deposition of the external electrodes 5 by electroless or electrolytic plating. Therefore, the configuration of the capacitor 1 is simplified because the conductor layers 13 are not provided only for the purpose of reducing warping.

The first external electrodes 5a may be configured to each include a portion that directly contacts the one or more first ceramic layers 11A and to not contain any co-material with the one or more first ceramic layers 11A. The second external electrodes 5b may be configured to each include a portion that directly contacts the one or more second ceramic layers 11B and to not contain any co-material with the one or more second ceramic layers 11B.

In this case, for example, the external electrodes 5 are formed using a method that does not require a base layer over their entire surfaces. Therefore, the asymmetry of the conductor paste (e.g., base electrodes 21) for reducing warpage is easily separated from the configuration of the external electrodes 5. As a result, for example, fabricating the capacitor 1 that is internally asymmetrical but externally vertically symmetrical is easy.

The average particle size of the metal particles 27 constituting the main component of the one or more first conductor layers 13A and the average particle size of the metal particles 27 constituting the main component of the one or more second conductor layers 13B may be respectively larger than the average particle size of the ceramic particles 31 constituting the main component of the one or more first ceramic layers 11A and the average particle size of the ceramic particles 31 constituting the main component of the one or more second ceramic layers 11B.

In this case, for example, warpage can be reduced via the mechanism described with reference to FIG. 5.

Among the one or more first conductor layers 13A, the thickness t3A of the first conductor layer 13A (first base electrodes 21A), which is positioned farthest toward the +D3 side and exposed from the first cover 9A on the +D3 side, is 1.2 times or more and 2.5 times or less the thickness t3B of the second conductor layer 13B (second base electrodes 21B), which is positioned farthest toward the −D3 side and exposed from the second cover 9B on the −D3 side, among the one or more second conductor layers 13B.

In this case, for example, the thickness t3A is 1.2 times or more the thickness t3B, which facilitates the previously mentioned effects. As a result of the thickness t3A being 2.5 times or less the thickness t3B, the likelihood of unintended inconveniences caused by asymmetry is reduced.

The first base electrodes 21A may be embedded from the +D3 side into the first ceramic layer 11A that is positioned farthest toward the +D3 side out of the one or more first ceramic layers 11A. The second base electrodes 21B may be embedded from the −D3 side into the second ceramic layer 11B that is positioned farthest toward the −D3 side out of the one or more second ceramic layers 11B.

In this case, for example, from another perspective, the base electrodes 21 are disposed in place of parts of the outermost ceramic layers 11, and therefore the base electrodes 21 occupy large proportions of the covers 9. As a result, for example, the effect of vertical asymmetry due to differences in the configurations of the first base electrodes 21A and the second base electrodes 21B are likely to appear.

The functional part 7 may include multiple internal electrodes 19 and multiple dielectric layers 17 stacked in an alternating manner in the D3 direction. In a perspective view in the D3 direction, the one or more first conductor layers 13A and the one or more second conductor layers 13B may include parts overlapping a region where the multiple internal electrodes 19 overlap each other (electrode bodies 19a).

In this case, for example, the conductor layers 13 can be said to have a relatively large area. Therefore, for example, the effects of increasing the thickness of the conductor layers 13 is improved.

In the above embodiments, the capacitors 1 and 201 are both an example of an electronic component. The D3 direction is an example of a first direction. The +D3 side is an example of a first side. The −D3 side is an example of a second side. The D1 direction is an example of a second direction. The D2 direction is an example of a third direction. Technologies according to the present disclosure are not limited to the above embodiments and may be implemented in the form of various embodiments.

What is claimed is:

1. An electronic component comprising:
a functional part comprising multiple internal electrodes and multiple dielectric layers stacked in an alternating manner in a first direction;
a first cover overlapping the functional part from a first side in the first direction; and
a second cover overlapping the functional part from a second side, the second side being on an opposite side from the first side, wherein the first cover includes
one or more first ceramic layers, and
one or more first conductor layers stacked in an alternating manner with the one or more first ceramic layers,
the second cover includes
one or more second ceramic layers, and
one or more second conductor layers stacked in an alternating manner with the one or more second ceramic layers,
the one or more first conductor layers include a first conductor layer that is thicker than any of the multiple internal electrodes; and
the one or more second conductor layers include a second conductor layer that is thicker than any of the multiple internal electrodes, and
a configuration of the first cover and a configuration of the second cover are asymmetrical with each other with respect to the functional part.

2. The electronic component according to claim 1, wherein the first cover and the second cover differ from each other in terms of at least one selected from a group consisting of thicknesses of corresponding layers, materials of corresponding layers, and numbers of conductor layers.

3. The electronic component according to claim 1, wherein the first cover is thicker than the second cover, and
a total thickness of the one or more first conductor layers is greater than a total thickness of the one or more second conductor layers.

4. The electronic component according to claim 1, wherein a thickness of the first conductor layer positioned farthest toward the first side, among the one or more first conductor layers, is greater than a thickness of the second conductor layer positioned farthest toward the second side, among the one or more second conductor layers.

5. The electronic component according to claim 1, wherein a thickness of the functional part in the first direction is smaller than both a length of the functional part in a second direction and a length of the functional part in a third direction, the second direction being perpendicular to the first direction and the third direction being perpendicular to the first direction and the second direction.

6. The electronic component according to claim 1, further comprising:
a first external electrode covering the first cover; and
a second external electrode covering the second cover,
wherein each of the one or more first conductor layers includes a part exposed to outside the first cover and bonded to the first external electrode, and
each of the one or more second conductor layers includes a part exposed to outside the second cover and bonded to the second external electrode.

7. The electronic component according to claim 1, further comprising:
a first external electrode covering the first cover; and
a second external electrode covering the second cover,
wherein the first external electrode includes a part that directly contacts the one or more first ceramic layers, and does not contain a co-material with the one or more first ceramic layers, and
the second external electrode includes a part that directly contacts the one or more second ceramic layers, and does not contain a co-material with the one or more second ceramic layers.

8. The electronic component according to claim 1,
wherein an average particle size of metal particles constituting a main component of the one or more first conductor layers and an average particle size of metal particles constituting a main component of the one or more second conductor layers are respectively larger than an average particle size of ceramic particles constituting a main component of the one or more first ceramic layers and an average particle size of ceramic particles constituting a main component of the one or more second ceramic layers.

9. The electronic component according to claim 1,
wherein a thickness of the first conductor layer positioned farthest toward the first side and exposed toward the first side from the first cover, among the one or more first conductor layers, is 1.2 times or more and 2.5 times or less a thickness of the second conductor layer positioned farthest toward the second side and exposed toward the second side from the second cover, among the one or more second conductor layers.

10. The electronic component according to claim 1,
wherein the first conductor layer positioned farthest toward the first side and exposed toward the first side from the first cover, among the one or more first conductor layers, is embedded, from the first side, in the first ceramic layer positioned farthest toward the first side, among the one or more first ceramic layers, and
the second conductor layer positioned farthest toward the second side and exposed toward the second side from the second cover, among the one or more second conductor layers, is embedded, from the second side, in the second ceramic layer positioned farthest toward the second side, among the one or more second ceramic layers.

11. The electronic component according to claim 1,
wherein, in perspective view in the first direction, the one or more first conductor layers and the one or more second conductor layers include parts overlapping a region where the multiple internal electrodes overlap each other.

12. The electronic component according to claim 1,
wherein the one or more first conductor layers comprise:
one or more layers of first electrodes located on a third side in a second direction, which intersects the first direction, relative to a center of the first cover in the second direction; and
one or more layers of second electrodes located on a fourth side, opposite to the third side, relative to the center of the first cover, and spaced apart from the one or more layers of first electrodes in the second direction,
the one or more second conductor layers comprise:
one or more layers of third electrodes located on the third side in the second direction, relative to a center of the second cover in the second direction; and
one or more layers of fourth electrodes located on the fourth side, relative to the center of the second cover, and spaced apart from the one or more layers of third electrodes toward the fourth side,
a total volume of the one or more layers of first electrodes is greater than a total volume of the one or more layers of third electrodes, and
a total volume of the one or more layers of second electrodes is greater than a total volume of the one or more layers of fourth electrodes.

13. The electronic component according to claim 12,
wherein a total thickness of the one or more layers of first electrodes is greater than a total thickness of the one or more layers of third electrodes, and
a total thickness of the one or more layers of second electrodes is greater than a total thickness of the one or more layers of fourth electrodes.

14. The electronic component according to claim 12,
wherein at least one of the one or more first conductor layers has a length in the second direction of the first electrode that is greater than a length in the second direction of each of the one or more layers of third electrodes, and a length in the second direction of the second electrode that is greater than a length in the second direction of each of the one or more layers of fourth electrodes.

15. The electronic component according to claim 1,
wherein the first cover is thicker than the second cover.

16. A method of manufacturing an electronic component, comprising:
stacking ceramic green sheets to obtain an unfired multilayer body; and
firing the unfired multilayer body,
wherein the unfired multilayer body includes
an unfired functional part comprising multiple internal conductive paste layers that form multiple internal electrodes and multiple ceramic green sheets that form multiple dielectric layers stacked in an alternating manner in a first direction,
an unfired first cover overlapping the unfired functional part from a first side in the first direction, and
an unfired second cover overlapping the unfired functional part from a second side, the second side being on an opposite side from the first side,
the unfired first cover includes
one or more first ceramic green sheets, and
one or more first conductive paste layers stacked in an alternating manner with the one or more first ceramic green sheets,
the unfired second cover includes
one or more second ceramic green sheets, and
one or more second conductive paste layers stacked in an alternating manner with the one or more second ceramic green sheets, and
the one or more first conductive paste layers include a first conductive paste layer that is thicker than any of the multiple internal conductive paste layers; and
the one or more second conductive paste layers include a second conductive paste layer that is thicker than any of the multiple internal conductive paste layers,
a configuration of the unfired first cover and a configuration of the unfired second cover are asymmetrical with each other with respect to the unfired functional part.

17. An electronic component comprising:
a functional part;
a first cover overlapping the functional part from a first side in a first direction; and
a second cover overlapping the functional part from a second side, the second side being on an opposite side from the first side,
wherein the first cover includes
one or more first ceramic layers, and
one or more first conductor layers stacked in an alternating manner with the one or more first ceramic layers, the second cover includes one or more second ceramic layers, and one or more second conductor layers stacked in an alternating manner with the one or more second ceramic layers, and a configuration of the first cover and a configuration of the second cover are asymmetrical with each other with respect to the functional part;

wherein the one or more first conductor layers comprise:

one or more layers of first electrodes located on a third side in a second direction, which intersects the first direction, relative to a center of the first cover in the second direction, and one or more layers of second electrodes located on a fourth side, opposite to the third side, relative to the center of the first cover, and spaced apart from the one or more layers of first electrodes in the second direction, the one or more second conductor layers comprise:

one or more layers of third electrodes located on the third side in the second direction, relative to a center of the second cover in the second direction; and one or more layers of fourth electrodes located on the fourth side, relative to the center of the second cover, and spaced apart from the one or more layers of third electrodes toward the fourth side, a total volume of the one or more layers of first electrodes is greater than a total volume of the one or more layers of third electrodes, and a total volume of the one or more layers of second electrodes is greater than a total volume of the one or more layers of fourth electrodes, and wherein the functional part includes multiple internal electrodes and multiple dielectric layers stacked in an alternating manner in the first direction, a thickness of each of the one or more layers of first electrodes is greater than a thickness of each of the multiple internal electrodes, a thickness of each of the one or more layers of second electrodes is greater than the thickness of each of the multiple internal electrodes, a thickness of each of the one or more layers of third electrodes is greater than the thickness of each of the multiple internal electrodes, and a thickness of each of the one or more layers of fourth electrodes is greater than the thickness of each of the multiple internal electrodes.

18. The electronic component according to claim 17, wherein the first cover and the second cover differ from each other in terms of at least one selected from a group consisting of thicknesses of corresponding layers, materials of corresponding layers, and numbers of conductor layers.

19. The electronic component according to claim 17, wherein a total thickness of the one or more layers of first electrodes is greater than a total thickness of the one or more layers of third electrodes, and a total thickness of the one or more layers of second electrodes is greater than a total thickness of the one or more layers of fourth electrodes.

* * * * *